(12) United States Patent
Tamai

(10) Patent No.: US 7,747,170 B2
(45) Date of Patent: Jun. 29, 2010

(54) OPTICAL CODE DIVISION MULTIPLEXING TRANSMISSION/RECEPTION METHOD AND OPTICAL CODE DIVISION MULTIPLEXING TRANSMISSION/RECEPTION DEVICE

(75) Inventor: Hideaki Tamai, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 676 days.

(21) Appl. No.: 11/602,989

(22) Filed: Nov. 22, 2006

(65) Prior Publication Data

US 2007/0122153 A1    May 31, 2007

(30) Foreign Application Priority Data

Nov. 25, 2005    (JP) .............................. 2005-340485

(51) Int. Cl.
*H04J 14/00* (2006.01)

(52) U.S. Cl. ........................................................ 398/77

(58) Field of Classification Search ................... 398/77, 398/79, 152, 184
See application file for complete search history.

(56) References Cited

U.S. PATENT DOCUMENTS 6,459,518 B1 * 10/2002 Suzuki et al. ............... 398/152

7,421,202 B2 * 9/2008 Hsu ............................. 398/54

FOREIGN PATENT DOCUMENTS

| JP | 2000-209186 | 7/2000 |
| JP | 2004-253931 | 9/2004 |
| JP | 2005-159453 A | 6/2005 |

OTHER PUBLICATIONS

"Enhanced of Transmission Data Rates in Incoherent FO-CDMA Systems", X. Wang et al., OECC 2000, Technical Digest, Jul. 2000, 14A2-5, pp. 458-459.
Office Action from corresponding Japanese Patent Application 2005-340485 mailed Dec. 1, 2009.

* cited by examiner

*Primary Examiner*—Quan-Zhen Wang
(74) *Attorney, Agent, or Firm*—Rabin & Berdo, P.C.

(57) ABSTRACT

A transmission unit comprises an optical pulse train generation unit, first channel encoded optical pulse signal generation unit, second channel encoded optical pulse signal generation unit, third channel encoded optical pulse signal generation unit, and fourth channel encoded optical pulse signal generation unit; the second and fourth channels further comprise polarization controllers respectively. By means of these polarization controllers, a polarization control step is executed in which the planes of polarization of first encoded optical pulse signals of the second and fourth channels are rotated by 90°. By executing the polarization control step, the directions of the planes of polarization of the first decoded optical pulse signals of adjacent channels in the reception unit can be caused to be mutually orthogonal.

6 Claims, 12 Drawing Sheets

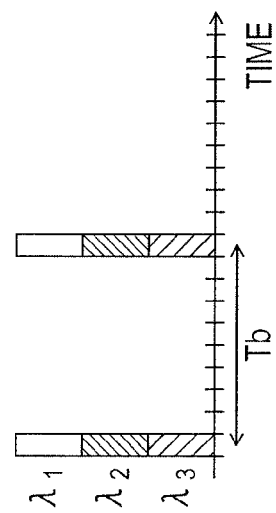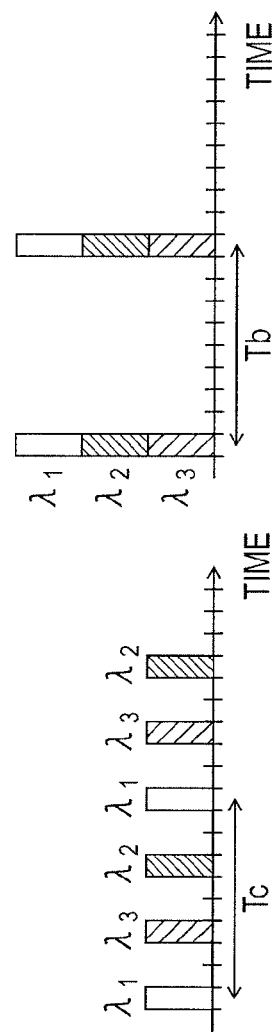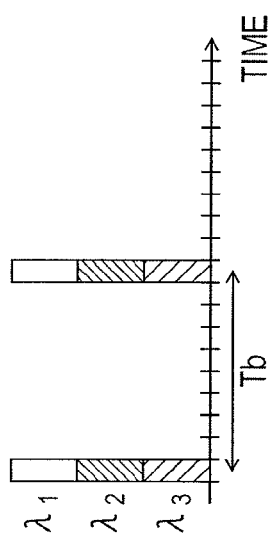

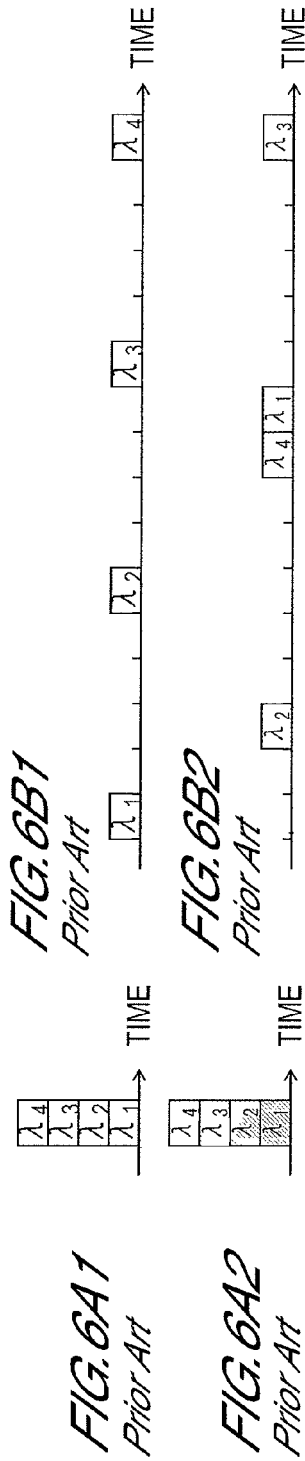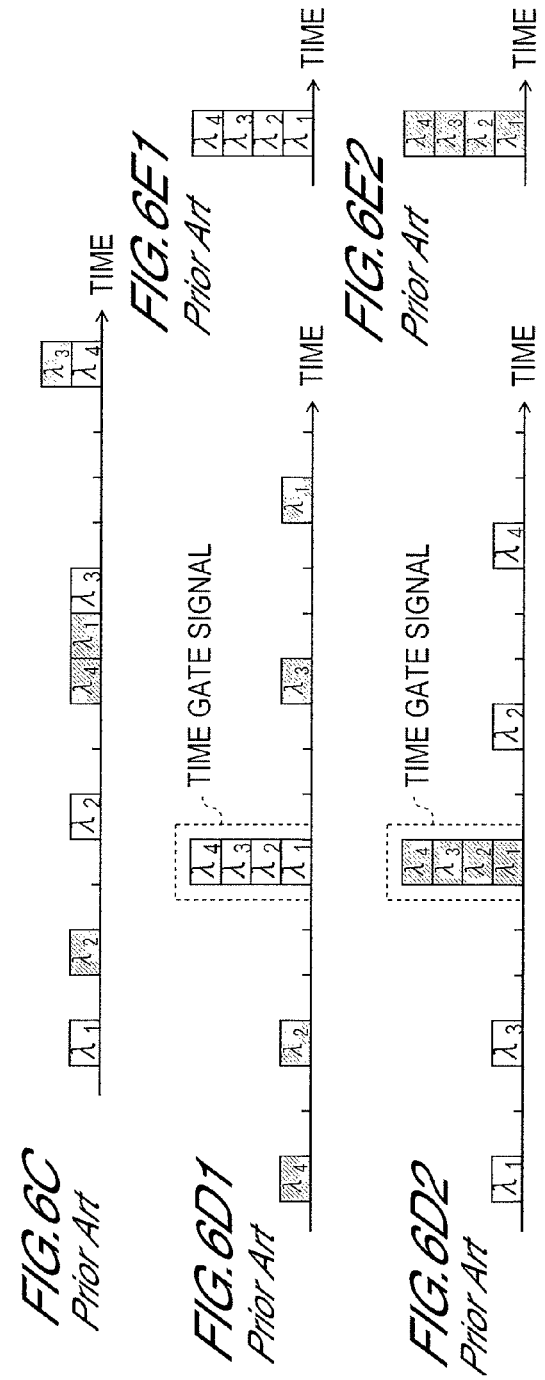

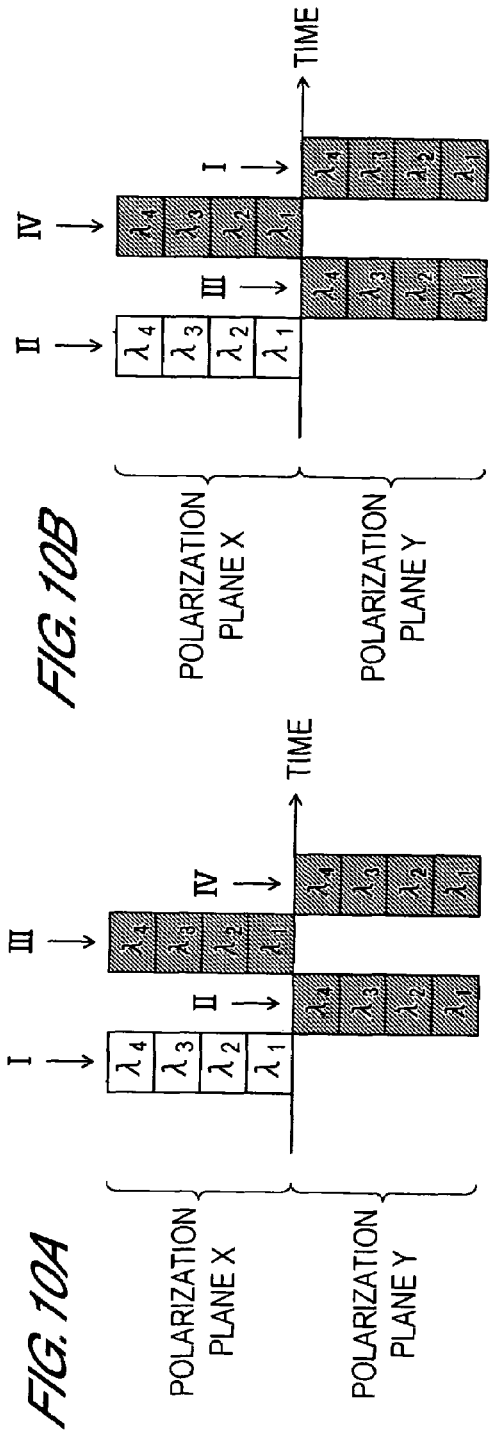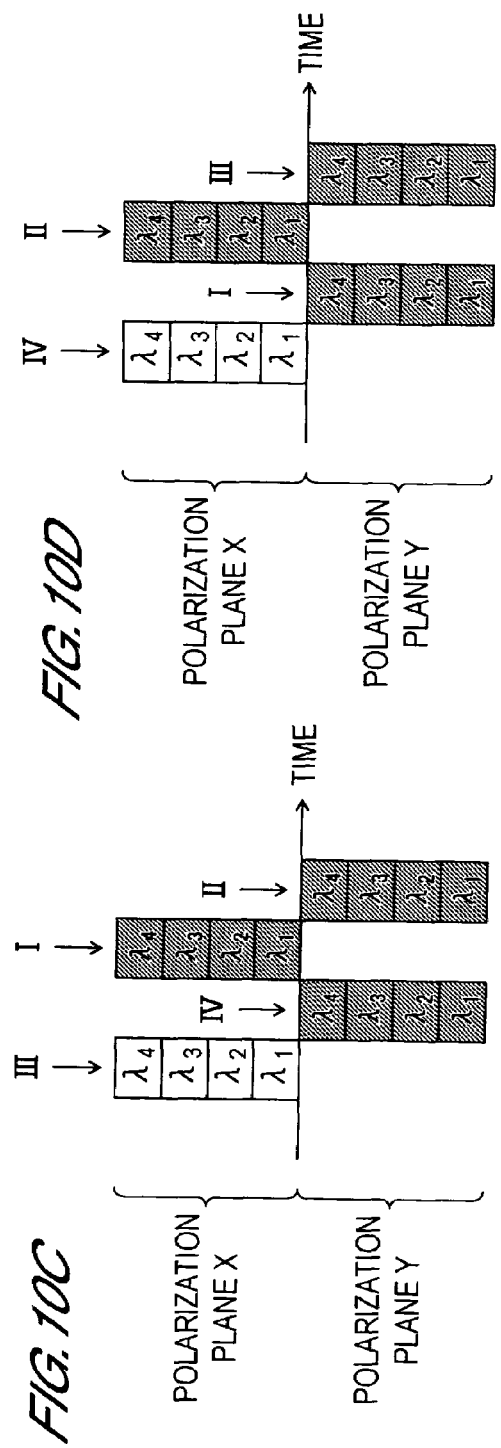

OPTICAL CODE DIVISION MULTIPLEXING TRANSMISSION/RECEPTION METHOD AND OPTICAL CODE DIVISION MULTIPLEXING TRANSMISSION/RECEPTION DEVICE

BACKGROUND OF THE INVENTION

1. Field of the Invention

The present invention relates to an optical communication device, and in particular relates to means to reduce reception error rates in an optical code division multiplexing (OCDM) transmission/reception device.

2. Description of Related Art

In metropolitan areas which are positioned midway between long-distance networks (which may also be called the "Internet backbone") and access lines, there is a mounting need for communication at faster communication speeds and with larger data capacity. This is because, whereas the bitrate of the existing Internet backbone is secured in the terabit-per-second communication range, in metropolitan areas communication speeds and capacities lag behind. Hereafter, in consideration of such circumstances as the spread of Internet use and increasing broadband content transmission, faster and higher-capacity communication in metropolitan areas is desired.

In order to increase communication capacity, optical multiplexing technology, in which optical pulse signals for a plurality of channels are combined and transmitted in a single optical fiber transmission path, are being studied. As optical multiplexing technology, active research is in progress on optical time division multiplexing (OTDM), wavelength division multiplexing (WDM), and OCDM. Among these, OCDM has the feature of excellent flexibility in practical applications; that is, per-bit limits in the time domain imposed in OTDM and WDM are not imposed in OCDM.

OCDM is a communication method in which different codes (patterns) are allocated to each channel, and pattern matching is used to extract signals. That is, OCDM is an optical multiplexing technique which uses a method in which, on the transmitting side, optical pulse signals are encoded using different codes for each communication channel, and on the receiving side the same codes as on the transmitting side are used to perform decoding to reproduce the original optical pulse signals.

During decoding, processing is performed in which only optical pulse signals for which codes match are extracted as valid signals, so that it is possible to assign optical pulse signals comprising light at the same wavelength, or the same combination of wavelengths, to a plurality of communication channels. Moreover, a super-structure fiber Bragg grating (SSFBG) or other receiving optical element can be used as the optical encoder, so that there are no electrical limits imposed, and faster signal rates can be accommodated. Further, a plurality of channels at the same wavelength can be multiplexed at the same time, enabling transmission of large amounts of data. OCDM is attracting interest for the dramatic improvement in communication capacity afforded in comparison with OTDM and WDM.

Encoding and decoding methods include direct spreading methods, time-spreading methods, wavelength-hopping methods, and time-spreading wavelength-hopping methods. Hereafter, codes used in time-spreading wavelength-hopping methods are called time-spreading wavelength-hopping codes. This invention relates to OCDM using time-spreading wavelength-hopping codes (see for example Japanese Patent Laid-open No. 2000-209186, and "Enhancement of transmission data rates in incoherent FO-CDMA systems", X. Wang and K. T. Chan, OECC 2000, Technical Digest, July 2000, 14A2-5, pp. 458-459).

In order to explain the features of an optical code division multiplexing transmission/reception method of this invention and of a device which implements such a method, first the processes of encoding and decoding by OCDM using a time-spreading wavelength-hopping code are explained, referring to FIG. 1. FIG. 1 is a summary block diagram of an optical code division multiplexing transmission/reception device (which hereafter may be called an "OCDM transmission/reception device"). FIG. 1 shows only a portion for one channel of the OCDM transmission/reception device, in order to focus on the processes of encoding and decoding.

In FIG. 1 and subsequent drawings, optical fibers and other optical pulse signal paths are indicated by thick lines, and electrical signal paths are indicated by thin lines. Numbers assigned to these thick lines and thin lines may refer to the paths themselves, or may mean the optical pulse signals or electrical signals propagating in the respective paths. Further, when there is a need to distinguish between a path and the signals propagating in the path, in addition to assigning a number to a path to indicate the path, an arrow may be written along the path and a number provided for the arrow, to indicate the signals propagating in the path.

The OCDM device is configured with the transmission unit 10 and reception unit 20 connected by a transmission path 28. The transmission path 28 is an optical fiber. The transmission unit 10 comprises a light source 12, optical pulse train generator 14, optical modulator 16, and encoder 18. The reception unit 20 comprises a decoder 22, photoelectric converter 24, and receiver 26. In the transmission unit 10, encoded optical pulse signals are generated and transmitted to the reception unit 20. In the reception unit 20, encoded optical pulse signals are received, decoded to reproduce the transmitted optical pulse signals, and the information thus sent is recognized.

The light source 12 is a multi-wavelength continuous-wave light source. Here, for convenience of explanation the light source 12 is assumed in the explanation to be a light source which outputs continuous-wave (CW) light comprising wavelength components at the different wavelengths $\lambda_1$, $\lambda_2$ and $\lambda_3$. However, in general the types of wavelengths comprised by optical pulses are not limited to three types, and even when two types, or four or more types, are comprised, the following explanation similarly obtains. In the following explanation, a light source which outputs CW light may be called a CW light source.

The CW light 13 output from the light source 12 is input to the optical pulse train generator 14, and an optical pulse train 15 is generated and output. An electrical clock signal from an electrical clock signal generator 78 is supplied to the optical pulse train generator 14, and by this means an optical pulse train 15 synchronized with the electrical clock signal is generated.

The optical pulse train 15 is input to the optical modulator 16 and is intensity-modulated in a RZ (Return-to-Zero) format to generate optical pulse signals 17, which are output. A transmission signal from the transmission signal generator 88 is supplied to the optical modulator 16, and by this means the optical pulse train 15 is converted into optical pulse signals 17. Hence the optical pulse signals 17 are optical pulse signals which reflect the binary digital electrical signals supplied by the transmission signal generator 88 to the optical modulator 16.

Below, references to optical pulse signals are used only to mean a train of optical pulses reflecting binary digital electrical signals, obtained by intensity modulation of an optical pulse train to convert electrical pulse signals into optical pulse signals. On the other hand, references to an optical pulse train refer to the entirety of optical pulses arranged at regular fixed time intervals on the time axis.

Optical pulse signals 17 are input to the encoder 18 and encoded, and sent over the transmission path 28 as encoded optical pulse signals 19. The encoded optical pulse signals 19 propagate over the transmission path 28 and are sent to the reception unit 20. In the reception unit 20, the encoded optical pulse signals 19 are input to the decoder 22 and decoded, generating decoded optical pulse signals 23 which are output. The same code as the code set in the encoder 18 is set in the decoder 22, and encoded optical pulse signals 19 are input to the decoder 22 to generate decoded optical pulse signals 23 having the same time waveform as the optical pulse signals 17 during transmission, which are output.

The decoded optical pulse signals 23 are input to the photoelectric converter 24 to generate electrical pulse signals 25, which are input to the receiver 26. The same code as the code set in the encoder 18 is set in the decoder 22, and so decoded optical pulse signals 23 output from the decoder 22 are generated as auto-correlated waveforms of the optical pulse signals 17 generated by the optical modulator 16 in the transmission unit 10. That is, in the reception unit 20, signals sent from the transmission unit 10 (transmission signals output by the transmission signal generator 88) are received in the receiver 26.

The signal transmission process in the above-described OCDM transmission/reception device is explained referring to the time waveforms at different times. FIG. 2A, FIG. 2B and FIG. 2C, as well as FIG. 3A, FIG. 3B and FIG. 3C show optical pulse signals, time waveforms of encoded optical pulse signals obtained in the encoding and decoding processes, auto-correlation waveforms, and cross-correlation waveforms. FIG. 2A and FIG. 3A are time waveforms of optical pulse signals 17, with time along the horizontal axis in arbitrary scale and the optical intensity along the vertical axis in arbitrary scale. In FIG. 1, the positions at which the time waveforms shown in FIG. 2A, FIG. 2B and FIG. 2C and in FIG. 3A, FIG. 3B and FIG. 3C are observed (indicated by the hollow arrows), as well as the signals corresponding to these time waveforms, are differentiated by appending A, B and C, in parentheses, to the numbers indicating the signals.

In FIG. 2A and FIG. 3A, the period indicated by Tb is the data period. The data period is the time interval on the time axis occupied by one optical pulse carrying one bit of information in the optical pulse signals. In general, n bits of optical pulse signals occupy duration of n×Tb on the time axis.

The light source 12 is a light source which outputs CW light comprising wavelength components with the different wavelengths $\lambda_1$, $\lambda_2$ and $\lambda_3$, and so an optical pulse train generated by the optical pulse train generator 14 comprises wavelength components with the center wavelengths $\lambda_1$, $\lambda_2$ and $\lambda_3$. Hence an optical pulse carrying one bit of information comprises wavelength components with the center wavelengths $\lambda_1$, $\lambda_2$ and $\lambda_3$. In order to represent this in FIG. 2A and FIG. 3A, rectangles are shown stacked at the same times, with different shadings (oblique-line patterns) to facilitate understanding.

The time waveform of the coded optical pulse signals 19 appear in FIG. 2B and FIG. 3B. A specific code (taken to be code 1) is assumed to be set in the encoder 18 in the following explanation. The optical pulse signals 17 are input to the encoder 18 and are encoded with time-spreading and wavelength-hopping using code 1, and are output as encoded optical pulse signals 19. Optical pulses comprised by the optical pulse signals 17 are spectrally analyzed into optical pulses with central wavelengths of $\lambda_1$, $\lambda_2$, $\lambda_3$ and similar, which are arranged as optical pulses comprising single-wavelength optical components on the time axis. The optical pulses comprising single-wavelength optical components may be called chip pulses. In FIG. 2B and FIG. 3B, chip pulses are indicated by rectangles denoted by $\lambda_1$, $\lambda_2$ and $\lambda_3$ as the encoded optical pulse signals 19.

The time interval required for time-spreading wavelength-hopping encoding of one optical pulse (one bit) comprised by the optical signals 17 to effect time-spreading arrangement on the time axis as a chip pulse train is called the code period, and in FIG. 2B and FIG. 3B is indicated by Tc. In FIG. 2A and FIG. 3A, and in FIG. 2B and FIG. 3B, the data period Tb and code period Tc are shown as equal; but in general, even when the data period Tb and code period Tc are not equal, OCDM transmission and reception methods can be implemented (see for example "Enhancement of transmission data rates in incoherent FO-CDMA systems", X. Wang and K. T. Chan, OECC 2000, 14A2-5, pp. 458 through 459 (2000)).

The time waveforms shown in FIG. 2A and FIG. 3A and in FIG. 2B and FIG. 3B schematically show optical pulses and chip pulses; but in actuality, the waveforms are Gaussian or other bell curve-type intensity waveforms. When representing lengths on the time axis such as the data period Tb or code period Tc, the center of one edge of the rectangle on the time axis is represented as the position of the maximum of the optical pulse or chip pulse time waveform. Hence the interval (data period Tb) on the time axis of adjacent optical pulses, shown as $\lambda_1$, $\lambda_2$ and $\lambda_3$ rectangles stacked at the same time, is represented as the interval between centers on one edge along the time axis of optical pulses, indicated by rectangles. Similar representations are used for chip pulses shown in FIG. 2B and FIG. 3B. The interval between a chip pulse of wavelength $\lambda_1$ and the next chip pulse of wavelength $\lambda_1$, with the wavelengths $\lambda_2$ and $\lambda_3$ intervening, is represented as an interval between center points of one edge on the time axis of chip pulses represented as rectangles. Hereafter, time waveforms of optical pulses and of chip pulses are similarly represented conceptually as rectangles, and the center-point positions (maximum positions) are represented as center points of one edge on the time axis.

FIG. 2C and FIG. 3C show time waveforms of decoded optical pulse signals 23 output from the decoder 22, showing cases in which the code set in the decoder 22 is code 1 and in which the code is code 2, different from code 1, respectively. By setting the decoder 22 to the code given by code 1, the encoded optical pulse signals 19, spread out in a chip pulse train on the time axis, are again reverse-spread on the time axis to obtain decoded optical pulse signals 23 with the same time waveform as the time waveform of the initial optical pulse signals 17, as shown in FIG. 2C.

Decoded optical pulse signals 23 with the same time waveform as the time waveform of the initial optical pulse signals 17, obtained by setting the same code in the encoder 18 and in the decoder 22, are called auto-correlated waveforms. On the other hand, when different codes are set in the encoder 18 and in the decoder 22, then as shown in FIG. 3C, decoded optical pulse signals 23 with the same time waveform as the time waveform of the optical pulse signals 17 cannot be obtained from the encoded optical pulse signals 19. Decoded optical pulse signals 23 with a time waveform different from the time waveform of the initial optical pulse signals 17, obtained by setting different codes in the encoder 18 and in the decoder 22, are called cross-correlated waveforms.

When SSFBGs are used to configure the encoder 18 and decoder 22, by arranging the grating of the SSFBG positioned in the encoder 18 and the grating of the SSFBG positioned in the decoder 22 such that the incident ends are arranged in a mirror-image arrangement, auto-correlated waveforms are obtained. That is, in order to form the encoder 18 and decoder 22 such that auto-correlated waveforms are obtained, the SSFBGs positioned in the encoder 18 and the decoder 22 should have grating arrangements with the same structure, and the incidence ends of the SSFBGs should be on mutually opposite sides.

Next, the configuration and operation of a conventional device to realize the above-described OCDM transmission and reception are explained, referring to FIG. 4 and FIG. 5. FIG. 4 and FIG. 5 are summary block diagrams of the transmission unit 30 and reception unit 90 respectively of a conventional OCDM transmission/reception device. In FIG. 4 and FIG. 5, a case is shown in which the number of multiplexed channels is two in order to simplify the explanation; but it is clear that the following explanation is not limited to the case of two channels, but applies similarly to multiplexing of three or more channels as well.

As shown in FIG. 4, the transmission unit 30 comprises an optical pulse train generation unit 34, first channel 36, and second channel 38.

The optical pulse train generation unit 34 comprises a multi-wavelength continuous-wave light source 32, electrical clock signal generator 134, and optical pulse train generator 50. The multi-wavelength light source 32 comprises CW light sources 40, 42, 44, 46 at wavelengths of $\lambda_1$, $\lambda_2$, $\lambda_3$ and $\lambda_4$ respectively, and an optical coupler 48. The CW light output from the CW light sources 40, 42, 44 and 46 is combined by the optical coupler 48 to generate multi-wavelength CW light 49, which is input to the optical pulse train generator 50. An electrical clock signal is supplied from the electrical clock signal generator 134 to the optical pulse train generator 50, and in the optical pulse train generator 50 the multi-wavelength CW light 49 is converted into a multi-wavelength pulse train 51 synchronized with this electrical clock signal. That is, a multi-wavelength optical pulse train 51 is generated and output by the optical pulse train generation unit 34.

The multi-wavelength optical pulse train 51 is input to the optical splitter 52 and divided into a first optical pulse train 53-1 and a second optical pulse train 53-2, which are supplied to the first channel 36 and the second channel 38 respectively.

The first optical pulse train 53-1 is input to the optical modulator 54, converted into optical pulse signals 55 and output, for input to the encoder 56. Upon input to the encoder 56, the optical pulse signals 55 are converted into encoded optical pulse signals 61-1 by the encoder 56, and are input to the multiplexer 62. Binary digital electrical signals which are the transmission signals for the first channel are supplied to the optical modulator 54 from the transmission signal generator 84, and these transmission signals of the first channel are reflected in the optical pulse signals 55.

On the other hand, the second optical pulse train 53-2 is input to the optical modulator 58 and converted into optical pulse signals 59 which are output for input to the encoder 60. The optical pulse signals 59 input to the encoder 60 are converted into encoded optical pulse signals 61-2 by the encoder 60, and are then input to the multiplexer 62. Binary digital electrical signals which are the transmission signals for the second channel are supplied to the optical modulator 58 from a transmission signal generator 86, and these transmission signals of the second channel are reflected in the optical pulse signals 59.

The encoded optical pulse signals 61-1 and 61-2 which have been input to the multiplexer 62 are combined to generate optical code division multiplexed signals 63, which are transmitted to the reception unit 90. The reception unit 90 is represented conceptually by the dashed-line square in FIG. 4, and is shown in detail in FIG. 5.

The structure and functions of the reception unit 90 of a conventional OCDM transmission/reception device are explained referring to FIG. 5. FIG. 5 is a summary block diagram of the reception unit 90. The reception unit 90 comprises a demultiplexer 64, first channel 80 and second channel 82. The first channel 80 comprises a decoder 66, time gate unit 68 and photoelectric converter 70; the second channel 82 comprises a decoder 72, time gate unit 74 and photoelectric converter 76.

Optical code division multiplexed signals 63 transmitted to the reception unit 90 are input to the demultiplexer 64 and divided into first optical code division multiplexed signals 65-1 and second optical code division multiplexed signals 65-2, which are supplied to the first channel 80 and second channel 82 respectively.

The first optical code division multiplexed signals 65-1 supplied to the first channel 80 are input to the decoder 66 and decoded, to generate first decoded optical pulse signals 67, which are output. The first decoded optical pulse signals 67 are input to the time gate unit 68 and subjected to time gate processing, to generate second decoded optical pulse signals 69, which are output. The second decoded optical pulse signals 69 are converted into first channel received signals by the photoelectric converter 70.

In the first decoded optical pulse signals 67, auto-correlated waveforms (hereafter sometimes called "signal components") and cross-correlated waveforms of the first channel optical pulse signals 55 are superposed; the cross-correlated waveforms are a noise component (sometimes called an "interference component") with respect to the auto-correlated waveforms. Consequently in order to reduce communication errors and similar and enhance reception quality, this noise component must be eliminated. Time gate processing executed in the time gate unit 68 is the means to eliminate the noise component. Time gate processing is processing in which the reception timing is adjusted for each channel such that the noise component and the signal component are not superposed on the time axis after decoding. Specifically, the time gate is put into the transmitting state (on state) during time zones in which the signal component passes through the time gate unit 68, and the time gate is put into the shutoff state (off state) during time zones in which the noise component passes through the time gate unit 68, so that only the signal component can pass through the time gate. After this processing, the signals output from the time gate unit 68 are the second decoded optical pulse signals 69.

On the other hand, the second optical code division multiplexed signals 65-2 supplied to the second channel 82 are similarly input to the decoder 72 and decoded, to generate first decoded optical pulse signals 73 which are output. The first decoded optical pulse signals 73 are input to the time gate unit 74 and subjected to time gate processing to generate second decoded optical pulse signals 75, which are output. The second decoded optical pulse signals 75 are converted into second channel received signals by the photoelectric converter 76.

As explained above, the first and second channel transmission signals transmitted from the transmission unit 30 are reproduced in the reception unit 90 as first and second channel received signals. That is, signals can be transmitted from the transmission unit 30 to the reception unit 90 by an optical code division multiplexing method.

The relation between the above-described auto-correlated waveforms and cross-correlated waveforms and time gate processing is explained more specifically, referring to FIG. 4, FIG. 5, and FIG. 6A1 to FIG. 6E2. In FIG. 4 and FIG. 5, numbers in parentheses indicating the signal observed as time waveforms in FIG. 6 are provided in order to distinguish between A1, A2, B1, B2, C, D1, D2, E1, and E2.

First, time-spreading wavelength-hopping codes are explained. In the following explanation, time-spreading wavelength hopping codes may be simply called "codes", to the extent that confusion does not arise. As an example, a 16-bit code ($\lambda_1$, 0, 0, 0, 0, $\lambda_2$, 0, 0, 0, 0, $\lambda_3$, 0, 0, 0, 0, $\lambda_4$) is used in the explanation. Here, the number of symbols in a sequence comprising "0", "$\lambda_1$", "$\lambda_2$", "$\lambda_3$" and "$\lambda_4$" which form codes may be called the code length. In this example, the code length is 16. The numerical sequences which provide codes are called code sequences, and each of the symbols in a code sequence, "0", "$\lambda_1$", "$\lambda_2$", "$\lambda_3$" and "$\lambda_4$", may be called a chip. Also, 0 and $\lambda_1$, $\lambda_2$, $\lambda_3$ and $\lambda_4$ may themselves be called code values.

The SSFBG comprised by the optical encoder is configured by arranging a plurality of unit FBGs; each unit FBG has a different Bragg reflection wavelength. Each of the chips of the code corresponds to each of the unit FBGs as a function of the distance from one input/output end of the SSFBG to the position at which each unit FBG is positioned, and the order of arrangement of each of the chips "0", "$\lambda_1$", "$\lambda_2$", "$\lambda_3$" and "$\lambda_4$". That is, the intended position at which each unit FBG is positioned is determined by fixed intervals from an input/output end of the SSFBG, and by positioning one of the chips "0", "$\lambda_1$", "$\lambda_2$", "$\lambda_3$" and "$\lambda_4$" at the intended position, each chip of the code sequence is associated with each unit FBG. A chip of "0" which is a code value of 0 means that no unit FBG exists at the corresponding position; and code values of "$\lambda_1$", "$\lambda_2$", "$\lambda_3$" and "$\lambda_4$" which are the chips "$\lambda_1$", "$\lambda_2$", "$\lambda_3$" and "$\lambda_4$" mean that unit FBGs having respective Bragg reflection wavelengths of $\lambda_1$, $\lambda_2$, $\lambda_3$ and $\lambda_4$ are positioned at the positions corresponding to "$\lambda_1$", "$\lambda_2$", "$\lambda_3$" and "$\lambda_4$".

In the case of unit FBGs the Bragg reflection wavelengths of which are $\lambda_1$, $\lambda_2$, $\lambda_3$ and $\lambda_4$, the spectrum of Bragg-reflected light reflected by each of the unit FBGs is not completely monochromatic light at $\lambda_1$, $\lambda_2$, $\lambda_3$ and $\lambda_4$, respectively (light with a spectral half-maximum width of 0), but rather has a fixed width. For example, in the case of a unit FBG for which the wavelength of Bragg-reflected light is $\lambda_1$, the spectrum of Bragg-reflected light reflected by the unit FBG comprises components at wavelengths which are slightly smaller than, and slightly greater than, $\lambda_1$, in addition to the component with wavelength $\lambda_1$. That is, in the case of a unit FBG with Bragg reflection wavelength of $\lambda_1$, the center wavelength of the spectrum of Bragg-reflected light from the unit FBG is $\lambda_1$.

Below, the necessity of time gate processing and other matters are explained referring to FIG. 6A1 through FIG. 6E2, assuming that the above-described 16-bit code ($\lambda_1$, 0, 0, 0, 0, $\lambda_2$, 0, 0, 0, 0, $\lambda_3$, 0, 0, 0, 0, $\lambda_4$) is the code allocated to the first channel as code 1, and another, different 16-bit code (0, 0, $\lambda_2$, 0, 0, 0, 0, $\lambda_4$, $\lambda_1$, 0, 0, 0, 0, $\lambda_3$) is allocated to the second channel as code 2. That is, code 1=($\lambda_1$, 0, 0, 0, 0, $\lambda_2$, 0, 0, 0, 0, $\lambda_3$, 0, 0, 0, 0, $\lambda_4$), and code 2=(0, 0, $\lambda_2$, 0, 0, 0, 0, $\lambda_4$, $\lambda_1$, 0, 0, 0, 0, $\lambda_3$).

FIG. 6A1 and FIG. 6A2 show time waveforms for one optical pulse comprised by optical pulse signals in the first channel and in the second channel respectively. The optical pulse signals in each channel comprise a plurality of optical pulses; but if encoding, decoding and similar are explained for one optical pulse in an optical pulse signal, the case is similar for the other optical pulses comprised by the optical pulse signal, and so here an example of a single optical pulse is explained. In order to easily distinguish between optical pulses belonging to the first and second channels, shading is applied in drawings to the optical pulse belonging to the second channel and to chip pulses comprised by the optical pulse. The optical pulses shown in FIG. 6A1 and FIG. 6A2 comprise light components at the different wavelengths $\lambda_1$, $\lambda_2$, $\lambda_3$, and $\lambda_4$. Further, the optical pulse shown in FIG. 6A1 corresponds to an optical pulse comprised by the first optical pulse train 53-1 shown in FIG. 4, and the optical pulse shown in FIG. 6A2 corresponds to an optical pulse comprised by the second optical pulse train 53-2 shown in FIG. 4.

FIG. 6B1 and FIG. 6B2 show time waveforms of the encoded optical pulse signals 61-1 and 61-2 in the first channel and second channel respectively shown in FIG. 4. The code set in the encoder 56 of the first channel is code 1, and so as shown in FIG. 6B1, chip pulses are arranged in the order given by code 1. First a chip pulse of wavelength $\lambda_1$ is arranged, and the four time slots corresponding to a code sequence of "0"s are blanks at which no chip pulses exist, then, a chip pulse of wavelength $\lambda_2$ is arranged. Similarly, chip pulses of wavelengths $\lambda_3$ and $\lambda_4$ are arranged at the respective corresponding time slots.

Similarly, the code set in the encoder 60 of the second channel is code 2, and so as shown in FIG. 6B2, chip pulses are arranged in the order given by code 2, similarly to the chip pulses for the above-described first channel.

FIG. 6C shows the time waveform for the optical code division multiplexed signal 63. The time waveform shown in FIG. 6C is the result of combination of the time waveforms of the encoded optical pulse signals 61-1 and 61-2 for the first channel and second channel, shown in FIG. 6B1 and FIG. 6B2.

FIG. 6D1 and FIG. 6D2 show time waveforms of first decoded optical pulse signals 67 and first decoded optical pulse signals 73 in the first channel and second channel respectively, shown in FIG. 5. As shown in FIG. 6D1, the decoder 66 for the first channel is set to code 1, so that the optical pulse of the first channel is reproduced as an auto-correlated waveform. In FIG. 6D1, this auto-correlated waveform is shown as rectangles indicated by the wavelengths $\lambda_1$, $\lambda_2$, $\lambda_3$ and $\lambda_4$, stacked at the same time. Similarly, the decoder 72 for the second channel is set to code 2, and so optical pulses for the second channel are reproduced as auto-correlated waveforms. In FIG. 6D2, this auto-correlated waveform is shown as shaded rectangles indicated by the wavelengths $\lambda_1$, $\lambda_2$, $\lambda_3$ and $\lambda_4$, stacked at the same time.

In FIG. 6D1 and FIG. 6D2, the chip pulse components other than the auto-correlated waveforms are noise components. Hence gate signals are sent to the respective time gate units 68 and 74 so that they are in the off state during time zones in which these noise components exist, and so that during time zones in which the auto-correlated waveforms exist they are in the on state. In FIG. 6D1 and FIG. 6D2, time zones in which the time gate units 68 and 74 are in the on state are surrounded by dashed-line rectangles. That is, in FIG. 6D1 the auto-correlated waveform in the first channel is surrounded by a dashed-line rectangle, indicating that the waveform passes through the time gate unit 68 and is output. In FIG. 6D2, the auto-correlated waveform of the second channel is surrounded by a dashed-line waveform, indicating that the waveform passes through the time gate unit 74 and is output.

FIG. 6E1 and FIG. 6E2 show time waveforms for the second decoded optical pulse signals 69 and second decoded optical pulse signals 75 of the first channel and second channel respectively, shown in FIG. 5. Only the auto-correlated waveforms of the first and second channels are allowed to pass through the time gate units 68 and 74 respectively, and cross-correlated waveform components are eliminated. That is, only one optical pulse among the optical pulses comprised by the optical pulse signals of the first channel and second channel, shown in FIG. 6A1 and FIG. 6A2 respectively, is reproduced as the second decoded optical pulse signal 69 and second decoded optical pulse signal 75.

However, when using an optical code division multiplexing transmission/reception method employing conventional time-spreading wavelength-hopping codes comprising the above-described time gate processing means, when the degree of multiplexing (the number of channels multiplexed) is high, and when the code period Tc is set to be short, cross-correlated waveform components appear at positions close to the auto-correlated waveforms on the time axis, so that there are cases in which the cross-correlated waveform components cannot be completely eliminated even when time gate processing means is executed.

In optical code division multiplexing transmission/reception methods using time-spreading wavelength-hopping codes, the signal-to-noise ratio (SNR), defined as the ratio of the intensity of auto-correlated waveforms obtained by decoding to the cross-correlated waveform intensity (maximum peak value), is defined by equation (1) below.

$$SNR = SNRn/(G \times M) \quad (1)$$
$$= (SNRn \times Tb)/(Tc \times M)$$

Here SNRn is the value of the SNR for a case in which only a single channel is transmitted by the optical code division multiplexing transmission/reception method, without performing multiplexing, and moreover Tb is set to Tc. M is the degree of multiplexing, that is, the number of channels multiplexed. G is a value defined to be equal to Tc/Tb.

In a high-speed optical communication system in which data is transmitted at high bitrates, a short code period Tc is accommodate by making the data period Tb short. In this case, G is increased, so that the SNR is lower. That is, as the speed of the optical communication system is increased, the SNR is lowered. Further, as the number of channels multiplexed is increased (as M is made larger), the SNR is again lowered.

The following is a more specific explanation of the cause of the above-described lowering of the SNR. As an example, a case is assumed in the explanation in which, for four-channel multiplexing (M=4), the code period Tc is four times the data period Tb (G=4), and the codes allocated to the first through fourth channels are given by the following code1 through code4.

code1=($\lambda_1$, 0, 0, 0, 0, $\lambda_2$, 0, 0, 0, 0, $\lambda_3$, 0, 0, 0, 0, $\lambda_4$)
code2=(0, 0, $\lambda_2$, 0, 0, 0, 0, 0, $\lambda_4$, $\lambda_1$, 0, 0, 0, 0, 0, $\lambda_3$)
code3=(0, 0, 0, 0, $\lambda_3$, 0, $\lambda_1$, 0, 0, 0, 0, 0, 0, $\lambda_4$, 0, $\lambda_2$)
code4=(0, 0, 0, 0, 0, 0, $\lambda_4$, 0, 0, $\lambda_3$, 0, 0, $\lambda_2$, 0, 0, $\lambda_1$)

Given the above assumptions, FIG. 7A through FIG. 7D show, within the range of the data period Tb, time waveforms of decoded optical pulse signals obtained by receiving and decoding optical code division multiplexed signals. In FIG. 7A through FIG. 7D, the horizontal axis is the time axis, and indicates the range of a data period Tb. The vertical axis indicates the optical intensity, on an arbitrary scale.

The time waveforms for the decoded optical pulse signals shown in FIG. 7A through FIG. 7D assume a case in which G=4 and also M=4, so that the respective chip pulse trains comprising 16 chip pulses obtained by decoding the respective optical pulses existing adjacently are arranged on the time axis as follows. That is, in the time zone in which the chip pulse train obtained by decoding one optical pulse corresponding to one bit is arranged, 12 chip pulses of a chip pulse train generated by decoding the optical pulse corresponding to the next adjacent bit exist overlapping on the time axis, in the amount of the time zone.

FIG. 7A, FIG. 7B, FIG. 7C and FIG. 7D show time waveforms of decoded optical pulse signals for the first, second, third, and fourth channels respectively. In FIG. 7A, FIG. 7B, FIG. 7C and FIG. 7D, the symbols I, II, III and IV indicate auto-correlated waveform components and cross-correlated waveform components comprising chip pulses from the first, second, third, and fourth channels respectively. Chip pulses which are unshaded are chip pulses comprising auto-correlated waveform components; shaded chip pulses indicate chip pulses comprising cross-correlated waveform components.

When the code set in the decoder comprised by each channel matches the code set in the encoder of the respective channel, chip pulses from the respective channel overlap in the same time slot within the same data period. That is, when an optical pulse exists in a time slot comprised by a transmitted optical pulse signal, the optical pulse is reproduced, and when no pulse exists, an optical pulse is not reproduced.

In the time waveform of a decoded optical pulse signal of the first channel, shown in FIG. 7A, chip pulses from the first channel (indicated by an unshaded rectangle) are stacked in the leading time slot position in the data period, and one optical pulse is reproduced. Similarly in the time waveforms of decoded optical pulse signals of the second, third and fourth channels in FIG. 7B, FIG. 7C and FIG. 7D respectively, chip pulses from the second, third and fourth channels (indicated by unshaded rectangles) are stacked in the leading time slot positions in the data period (the same time slot position in the same data period), reproducing one optical pulse.

In FIG. 7A, FIG. 7B, FIG. 7C and FIG. 7D, shaded rectangles represent chip pulses from channels other than the respective channels, that is, noise components. In the time waveform of the decoded optical pulse signal for the first channel shown in FIG. 7A, the chip pulses from channels other than the first channel, indicated by II, III and IV, are represented by shaded rectangles. Similarly in the time waveform of the decoded optical pulse signal of the second channel shown in FIG. 7B, chip pulses from channels other than the second channel, indicated by I, III and IV, are represented by shaded rectangles. Time waveforms of decoded optical pulse signals for the third and fourth channels, shown in FIG. 7C and FIG. 7D, are also similarly represented.

Different wavelength components in the time zone forming the same data period at the time of transmission are not superposed at the same position on the time axis after decoding. However, chip pulses arising from the time zone forming different data periods may be superposed at the same position on the time axis after decoding. Hence there are a total of five states of chip pulses forming cross-correlated waveforms, which are noise components, superposed at the same position on the time axis: no chip pulses exist, one chip pulse exists, two superposed chip pulses exist, three superposed chip pulses exist, and four superposed chip pulses exist.

Chip pulses forming cross-correlated waveforms which are noise components occur randomly in five superposed states on the time axis. When optical pulse signals are decoded using a time-spreading wavelength-hopping code, the higher the density of optical pulses comprised by an optical pulse signal, the higher is the frequency of superpositioning of at the same position on the time axis after decoding of chip pulses occurring in time zones forming different data periods. As an extreme case, when optical pulse signals in each of the channels completely fill the time slots in which all optical pulses are placed, four chip pulses forming cross-correlated waveforms which are noise components exist superpositioned in one position on the time axis.

Specifically, for binary digital signals in which "1" indicates an optical pulse exists and "0" indicates no optical pulse, the above corresponds to a case in which all bits are "1", as in "1, 1, 1, 1, 1, 1, 1, . . . ".

Chip pulses are not optical pulses which have exactly a single wavelength; rather, the optical spectrum has a finite width. Consequently the time gate signal comprises not only the auto-correlated waveform component, but noise components as well. That is, in conventional methods the edges on the frequency axis of chip pulses forming cross-correlated waveforms are superposed on each other, and as a result cause beat noise to occur.

Hence an object of this invention is to provide an OCDM transmission/reception method and OCDM transmission/reception device using which decoded optical pulse signals free of the above-described noise can be obtained, even when numerous channels are multiplexed, or when the code period is set to be short. As a result, optical communication with a low reception error rate can be realized.

SUMMARY OF THE INVENTION

The optical code division multiplexing transmission/reception method of a first invention comprises the following transmission steps and reception steps.

The transmission step is a step in which optical pulse signals, comprising light of different wavelengths to be allocated to each channel and transmitted, are encoded using time-spreading wavelength-hopping codes which are different for each channel to generate encoded optical pulse signals, and the encoded optical pulse signals are multiplexed and transmitted as code division multiplexed signals. The transmission step is characterized in comprising a polarization control step of controlling the plane of polarization of encoded optical pulse signals such that the planes of polarization of encoded optical pulse signals in adjacent channels are mutually orthogonal.

The reception step is a step of performing intensity-division by channel of optical code division multiplexed signals, decoding the divided optical code division multiplexed signals using the same code as the time-spreading wavelength-hopping codes for each channel, generating decoded optical pulse signals comprising auto-correlated waveforms components and cross-correlated waveform components of the optical pulse signals, and extracting only the auto-correlated waveform components from the decoded optical pulse signals to obtain received signals.

It is suitable that the above-described reception step comprise a clock signal extraction step of extracting a clock signal from the intensity-divided optical code division multiplexed signals, and a time gate processing step of using the clock signal extracted in the clock signal extraction step to retrieve only the auto-correlated waveform components from the decoded optical pulse signals.

The optical code division multiplexing transmission/reception method of the first invention can be realized by means of an optical code division multiplexing transmission/reception device of this invention, described next. That is, a device to realize the optical code division multiplexing transmission/reception method of the first invention is configured having a transmission unit and a reception unit.

In addition to an encoder set to different time-spreading wavelength-hopping codes for each channel, the transmission unit comprises a polarization controller which controls the planes of polarization of encoded optical pulse signals such that the planes of polarization of encoded optical pulse signals in adjacent channels are mutually orthogonal. By means of the encoder, optical pulse signals comprising light of different wavelengths, allocated to different channels and transmitted, are encoded using different time-spreading wavelength-hopping codes for each channel to generate encoded optical pulse signals. And by means of the polarization controller, the polarization control step of controlling the planes of polarization of these encoded optical pulse signals is executed. In the transmission unit, following this control of the planes of polarization, the encoded optical pulse signals are multiplexed and transmitted as optical code division multiplexed signals.

It is suitable that the reception unit comprise a clock signal extractor, which extracts a clock signal from the intensity-divided optical code division multiplexed signals; a decoder, which is set to the same code as the code set in the encoder; and a time gate unit, which uses the clock signal to retrieve only the auto-correlated waveform components from the decoded optical pulse signals. By means of this decoder, optical code division multiplexed signals which have been intensity-divided by channel are decoded by channel, and decoded optical pulse signals, comprising auto-correlated waveform components and cross-correlated waveform components of the optical pulse signals, are generated. In the reception unit, only the auto-correlated waveform components are extracted from these decoded optical pulse signals, to obtain received signals. By means of the clock signal extractor, clock signals are extracted from optical code division multiplexed signals, and by means of the time gate unit, these clock signals are used to retrieve only auto-correlated waveform components from the decoded optical pulse signals.

The optical code division multiplexing transmission/reception method of a second invention comprises the following transmission step (A) and reception step (B).

The transmission step (A) is a transmission step in which optical pulse signals comprising light at different wavelengths, to be allocated to each channel and transmitted, are encoded using a different time-spreading wavelength-hopping code for each channel to generate encoded optical pulse signals, and these encoded optical pulse signals are multiplexed and transmitted as optical code division multiplexed signals; the transmission step (A) comprises the following substeps A1 through A7.

(A1) A step of causing continuous-wave light of different wavelengths to be generated (substep A1)

(A2) A first polarization control step of controlling the planes of polarization such that the planes of polarization of continuous-wave light, alternating in the order of the wavelengths of the continuous-wave light, are orthogonal (substep A2)

(A3) A step of combining the continuous-wave light with polarization planes controlled, and generating multi-wavelength continuous-wave light (substep A3)

(A4) A step of converting multi-wavelength continuous-wave light into an optical pulse train (substep A4)

(A5) A step of converting the optical pulse train into optical pulse signals (substep A5)

(A6) A step of converting the optical pulse signals into encoded optical pulse signals (substep A6)

(A7) A second polarization control step of controlling the planes of polarization of the encoded optical pulse signals, such that the planes of polarization of encoded optical pulse signals in adjacent channels are mutually orthogonal (substep A7)

The reception step (B) is a step in which optical code division multiplexed signals are intensity-divided by channel, the divided optical code division multiplexed signals are decoded using the same codes as the time-spreading wavelength-hopping codes used when encoding by channel, decoded optical pulse signals comprising the auto-correlated waveform components and cross-correlated waveform components of the optical pulse signals are generated, and only the auto-correlated waveform components are extracted from the decoded optical pulse signals to obtain received signals; the reception step (B) comprises the following substeps B1 and B2.

(B1) A clock signal extraction step of extracting a clock signal from optical code division multiplexed signals (substep B1)

(B2) A time gate processing step of using the clock signal to retrieve only the auto-correlated waveform components from the decoded optical pulse signals (substep B2)

The optical code division multiplexing transmission/reception method of the second invention can be realized by means of an optical code division multiplexing transmission/reception device of this invention, described next. That is, a device to realize the optical code division multiplexing transmission/reception method of the second invention is configured having the following transmission unit and reception unit.

The transmission unit has functions for using an encoder, set to different time-spreading wavelength-hopping codes for each channel, to encode optical pulse signals comprising light of different wavelengths and which are to be allocated to each channel and transmitted, to generate encoded optical pulse signals, and for multiplexing the encoded optical pulse signals and transmitting the signals as optical code division multiplexed signals.

The transmission unit comprises a continuous-wave light source; a first polarization controller; an optical coupler; an optical pulse train generator; an optical modulator; an encoder; and a second polarization controller. The continuous-wave light source generates continuous-wave light of different wavelengths. The first polarization controller executes the first polarization control step of controlling the planes of polarization such that the planes of polarization of continuous-wave light, alternating in the order of the wavelengths of the continuous-wave light, are orthogonal. The optical coupler combines the continuous-wave light with controlled planes of polarization, to generate multi-wavelength continuous-wave light. The optical pulse train generator converts the multi-wavelength continuous-wave light into an optical pulse train. The optical modulator converts the optical pulse train into optical pulse signals. The encoder converts the optical pulse signals into encoded optical pulse signals. The second polarization controller executes the second polarization control step of controlling the planes of polarization of the encoded optical pulse signals, such that the planes of polarization of encoded optical pulse signals in adjacent channels are mutually orthogonal.

The reception unit has functions for intensity-dividing optical code division multiplexed signals by channel, decoding the divided optical code division multiplexed signals using a decoder in which is set the same code as the time-spreading wavelength-hopping code used during encoding by channel, generating decoded optical pulse signals comprising the auto-correlated waveform components and cross-correlated waveform components of the optical pulse signals, and extracting only the auto-correlated waveform components from the decoded optical pulse signals to obtain received signals.

It is suitable that the reception unit comprise a clock signal extractor and a time gate unit. The clock signal extractor extracts clock signals from optical code division multiplexed signals. The time gate unit uses clock signals to retrieve only the auto-correlated waveform components from the decoded optical pulse signals.

The transmission step of the optical code division multiplexing transmission/reception method of the first invention is characterized in differing from similar optical code division multiplexing transmission/reception methods of the prior art in comprising a polarization control step of controlling the planes of polarization of encoded optical pulse signals such that the planes of polarization of encoded optical pulse signals in the above-described adjacent channels are mutually orthogonal.

An optical code division multiplexing transmission/reception device to implement the optical code division multiplexing transmission/reception method of the first invention comprises a polarization controller which executes the above-described polarization control.

Thus according to the first invention, a polarization control step is executed by this polarization controller, and the planes of polarization of encoded optical pulse signals are controlled so as to be mutually orthogonal in adjacent channels. Although the details are explained below, by this means the planes of polarization of chip pulses from adjacent channels are orthogonal even in decoded optical pulse signals. No interference occurs between chip pulses having orthogonal planes of polarization.

Hence according to the first invention, interference between chip pulses does not occur, so that even when the number of multiplexed channels is large, or when the code period is set to be short, decoded optical pulse signals in which cross-correlated waveform components are sufficiently eliminated are obtained, and there is the advantage that received signals can be obtained with minimal beat noise occurring due to the superpositioning of the edge portions on the frequency axis of chip pulses forming auto-correlated waveforms and chip pulses forming cross-correlated waveforms.

The optical code division multiplexing transmission/reception method of the second invention is characterized in differing from similar optical code division multiplexing transmission/reception methods of the prior art in comprising a first polarization control step of controlling the planes of polarization of continuous-wave light such that the planes of polarization, alternating in the order of the wavelengths of the continuous-wave light, are orthogonal, and a second polarization control step of controlling the planes of polarization of encoded optical pulse signals such that the planes of polarization of encoded optical pulse signals in adjacent channels are mutually orthogonal.

An optical code division multiplexing transmission/reception device to implement the optical code division multiplexing transmission/reception method of the second invention comprises a first polarization controller and second polarization controller which execute the above-described first and second polarization control.

Thus according to the second invention, the first polarization control step is executed by the first polarization controller, and the planes of polarization of continuous-wave light, alternating in the order of the wavelengths of the continuous-wave light, are orthogonal. Further, the second polarization control step is executed by the second polarization controller, and the planes of polarization of encoded optical pulse signals are controlled such that the planes of polarization of the encoded optical pulse signals in adjacent channels are mutually orthogonal. Hence through execution of the first polarization control step, the planes of polarization of adjacent wavelength components in the same channel are orthogonal. As a result, interference between adjacent wavelength components in the same channel does not occur. Further, by executing the second polarization control step, the planes of polarization of encoded optical pulse signals in adjacent channels are controlled so as to be mutually orthogonal; hence, although the details are explained below, the planes of polarization of chip pulses from adjacent channels are orthogonal even in decoded optical pulse signals. Hence there is no interference either between same-wavelength components in adjacent channels.

Hence according to the second invention, by comprising a first polarization control step and a second polarization control step, in addition to the advantage that, even when the number of channels multiplexed is large, or when the code period is set to be short, there is minimal beat noise caused by the superpositioning of the edge portions on the frequency axis of chip pulses forming auto-correlated waveforms and of chip pulses forming cross-correlated waveforms, similarly to the optical code division multiplexing transmission/reception method of the first invention, there is also the advantage that decoded optical pulse signals can be obtained having minimal beat noise caused by the superpositioning of adjacent wavelength components on the frequency axis of auto-correlated waveforms as well.

Further, as the density of optical pulses comprised by optical pulse signals rises, it becomes more difficult to distinguish optical pulses forming auto-correlated waveforms from optical pulses forming cross-correlated waveforms. In such cases, there are occasions on which threshold-value processing cannot be used to select only optical pulses forming auto-correlated waveforms.

In the optical code division multiplexing transmission/reception methods of the first and second inventions, by comprising a clock signal extraction step and a time gate processing step, clock signals can be used to realize the time gate processing step. By means of this time gate processing step, even in cases in which only optical pulses forming auto-correlated waveforms cannot be selected by threshold value processing, cross-correlated waveform components, which are noise components, can be even more effectively eliminated from decoded optical pulse signals. Consequently, by executing the time gate processing step, received signals with a still higher S/N ratio can be obtained.

BRIEF DESCRIPTION OF THE DRAWINGS

The foregoing and other objects, features and advantages of the present invention will be better understood from the following description taken in connection with the accompanying drawings, in which:

FIG. 2 shows a chip pulse train and auto-correlated waveform obtained in the processes of encoding and decoding;

FIG. 6 is used in explaining the relation of auto-correlated waveforms and cross-correlated waveforms to time gate processing;

FIG. 10 shows the time waveforms of decoded optical pulse signals in the range of the time zone Tb in the optical code division multiplexing transmission/reception method of the first invention;

DESCRIPTION OF THE PREFERRED EMBODIMENTS

Figure 1:
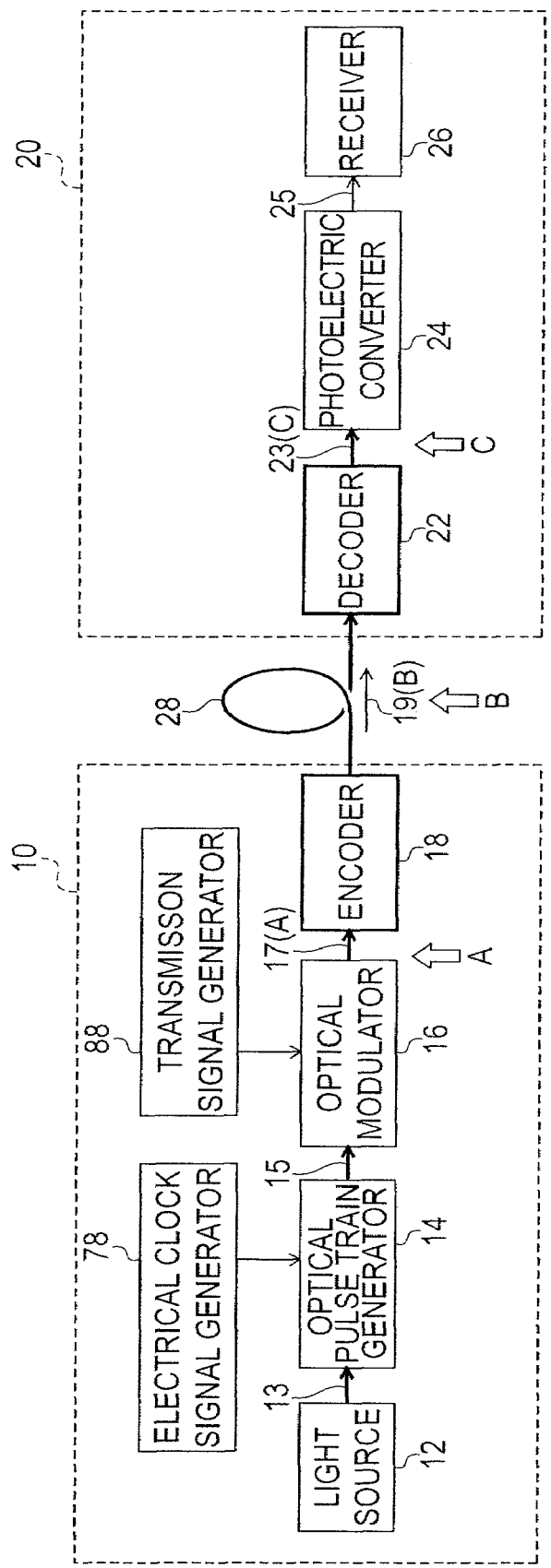
FIG. 1 is a summary block diagram of an optical code division multiplexing transmission/reception device.
Figure 3A:
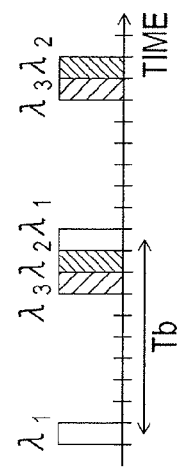
FIG. 3 shows a chip pulse train and cross-correlated waveform obtained in the processes of encoding and decoding.
Figure 3B:
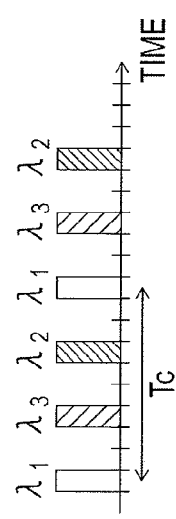
Figure 3C:
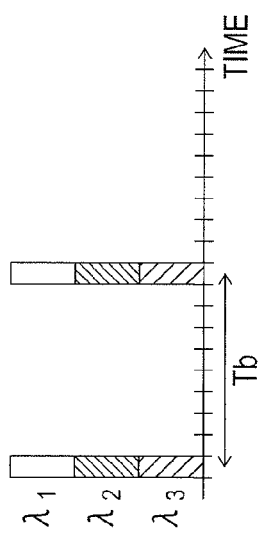
Figure 4:
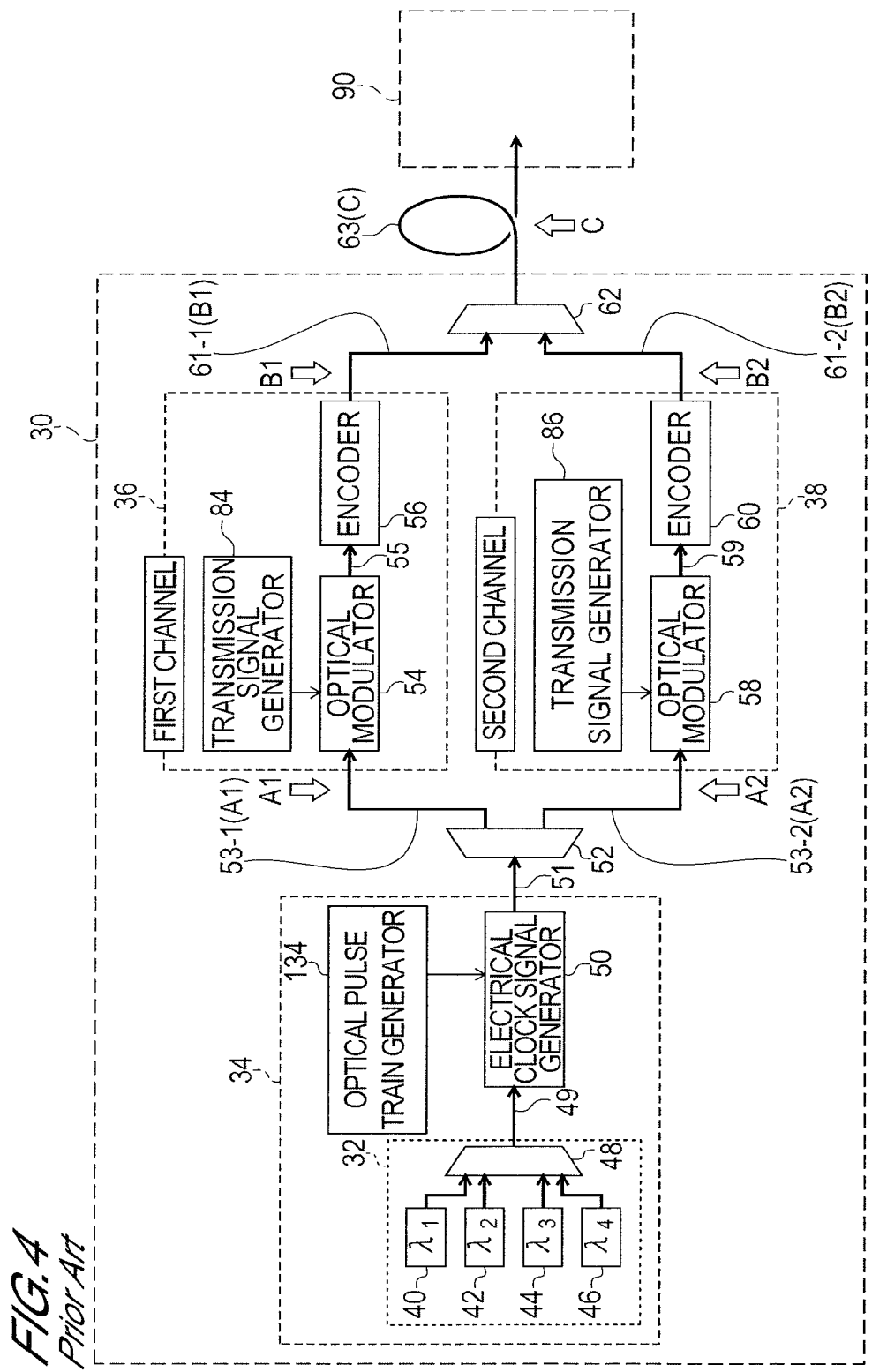
FIG. 4 is a summary block diagram of the transmission unit of a conventional OCDM transmission/reception device.
Figure 5:
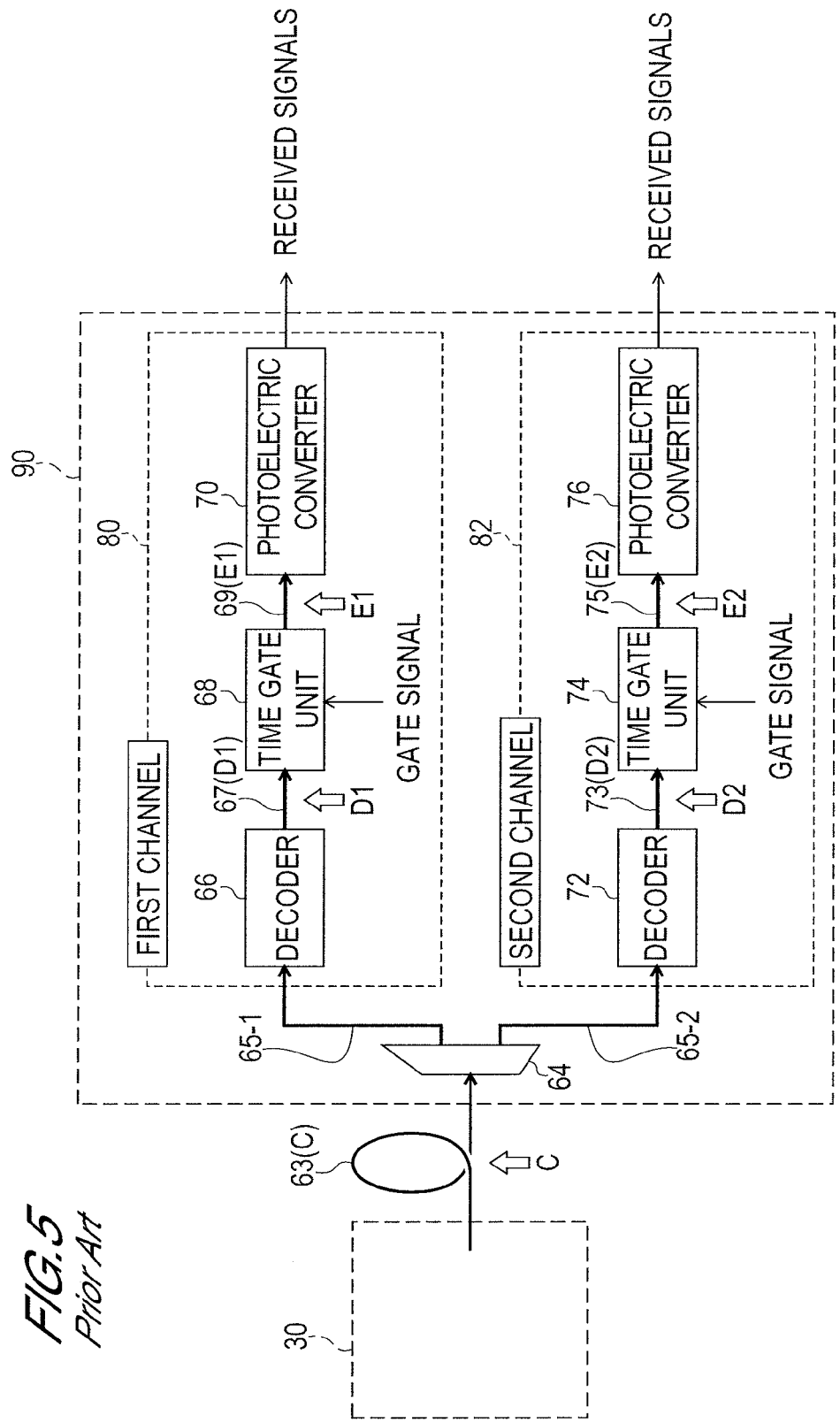
FIG. 5 is a summary block diagram of the reception unit of a conventional OCDM transmission/reception device.
Figures 7A, 7B, 7C, 7D:
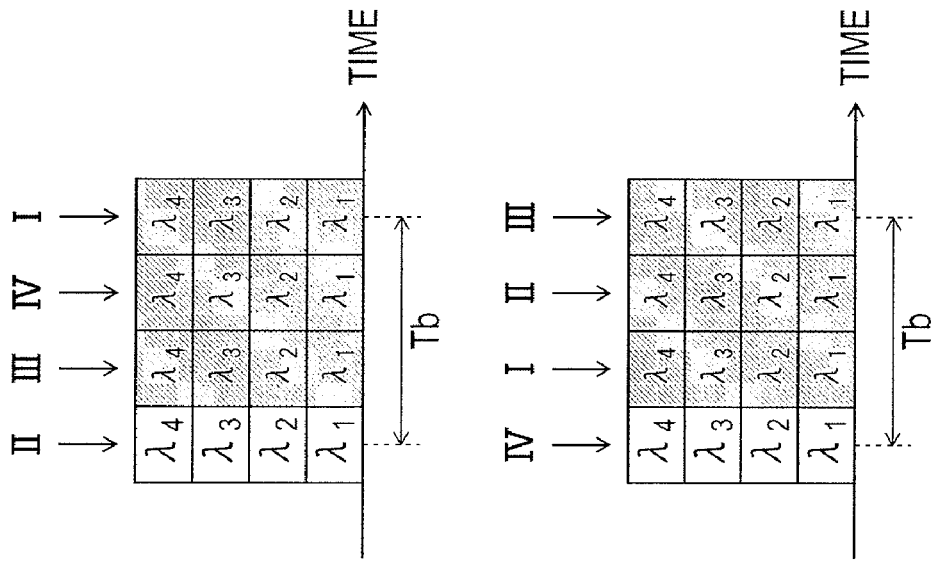
FIG. 7 shows the time waveforms of decoded optical pulse signals in the range of the time zone Tb.

Below, aspects of the invention are explained referring to the drawings. The drawings illustrate examples of configurations related to the invention, are merely show in summary the cross-sectional shapes, arrangements and similar of the constituent elements to an extent enabling understanding of the invention; the invention is not limited to the illustrated examples. In the following explanations, specific materials, conditions and similar may be used, but these are merely preferred examples of the materials and conditions, and the invention is not limited thereto.

First Embodiment

Figure 8:
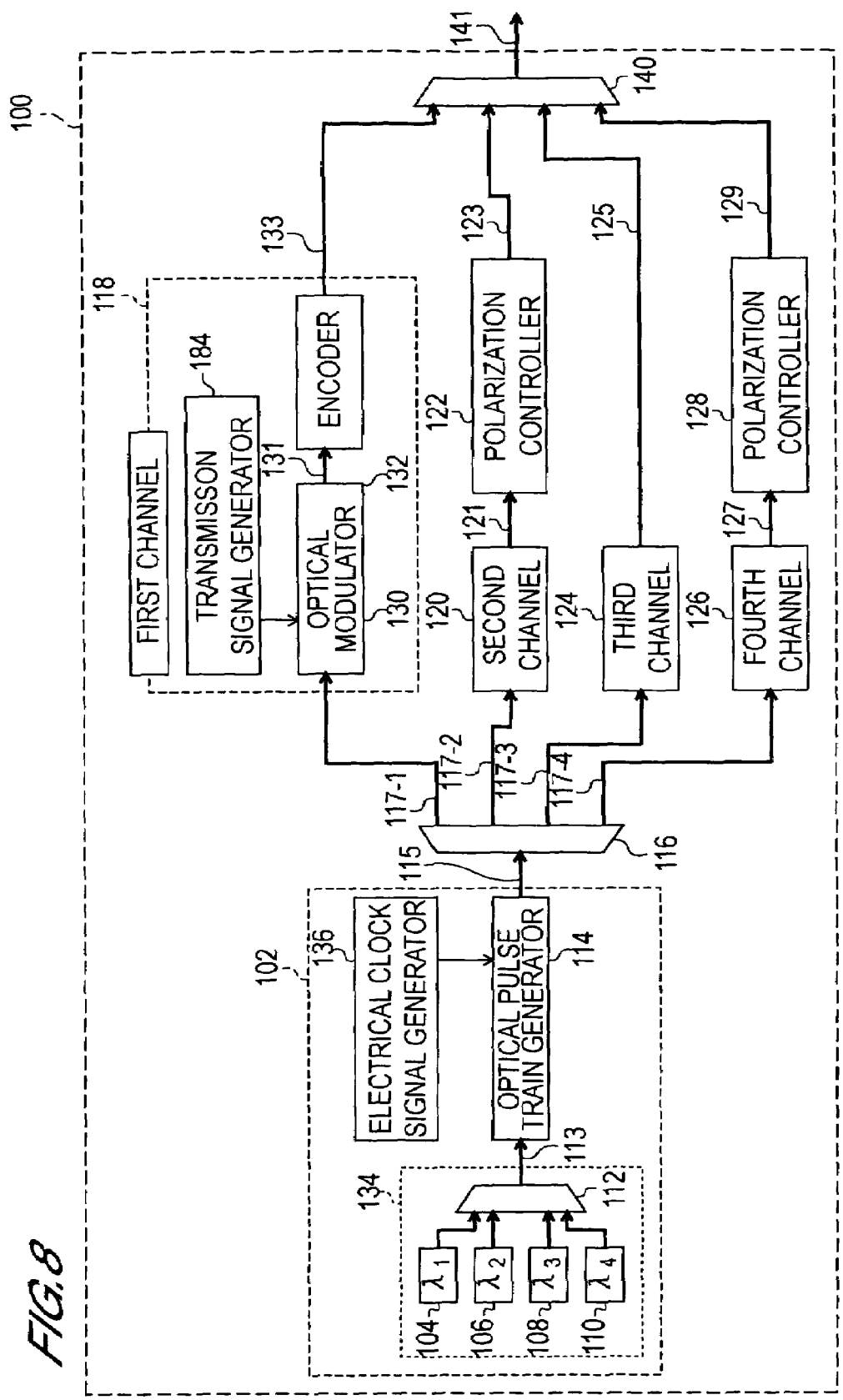
FIG. 8 is a summary block diagram of the transmission unit of an optical code division multiplexing transmission/reception device to implement the optical code division multiplexing transmission/reception method of the first invention.
Figure 9:
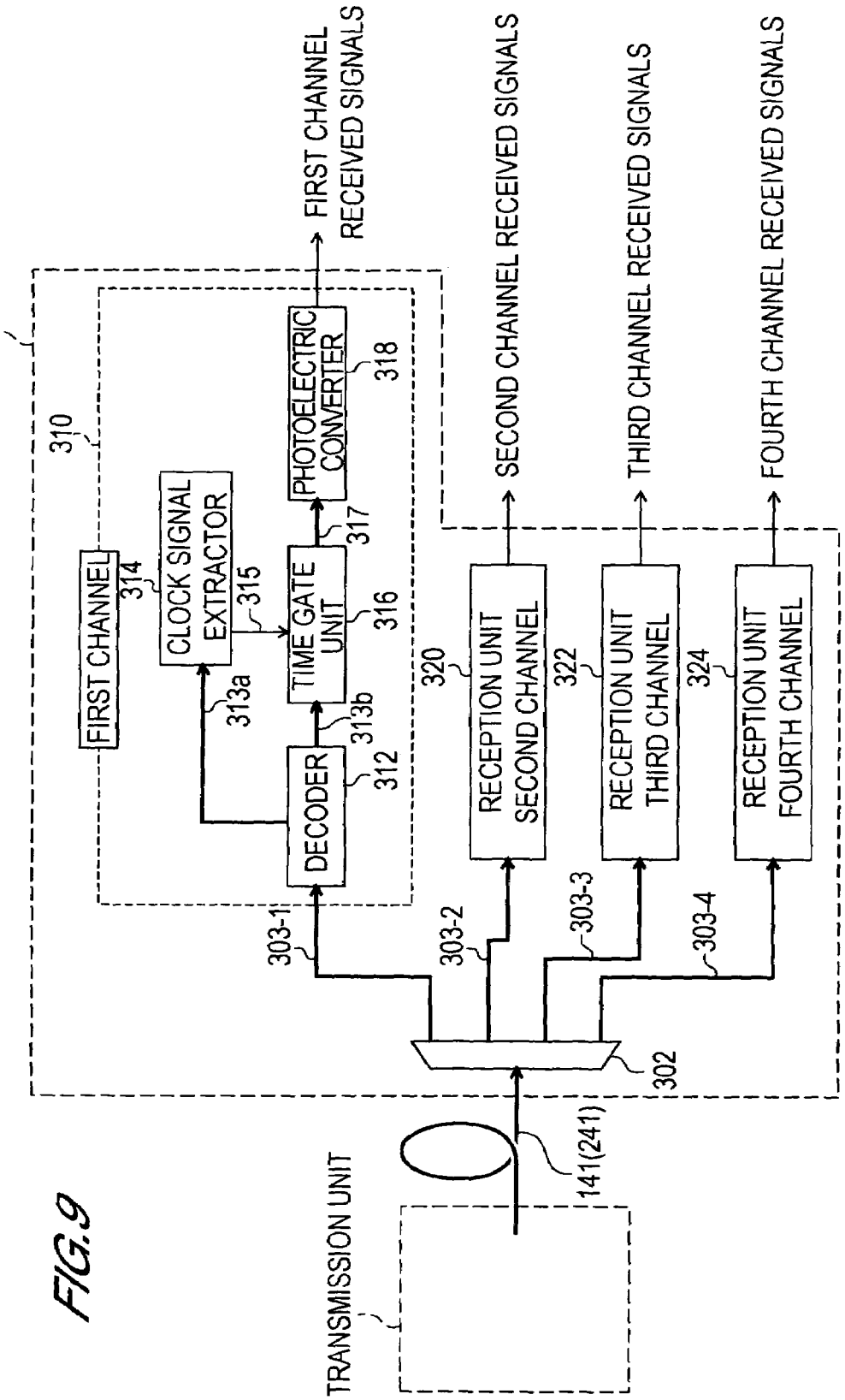
FIG. 9 is a summary block diagram of the reception unit of the optical code division multiplexing transmission/reception device of the first or the second invention.

The optical code division multiplexing transmission/reception method of a first invention, and the structure and operation of a device to implement this method, are explained referring to FIG. 8 and FIG. 9. FIG. 8 is a summary block diagram of the transmission unit of a device to implement the optical code division multiplexing transmission/reception method of the first invention. FIG. 9 is a summary block diagram of the reception unit of a device to implement the optical code division multiplexing transmission/reception method of the first invention, or of a second invention, described below. In FIG. 8 and FIG. 9, a case is shown in which the number of channels multiplexed is four; however, the following explanation is clearly not limited to the case of four channels, but obtains similarly for other numbers of channels.

As shown in FIG. 8, the transmission unit 100 comprises an optical pulse train generation unit 102, optical splitter 116, first channel encoded optical pulse signal generation unit 118, second channel encoded optical pulse signal generation unit 120, third channel encoded optical pulse signal generation unit 124, and fourth channel encoded optical pulse signal generation unit 126. In addition to these, a characteristic is the provision of polarization controllers 122 and 128.

The first channel encoded optical pulse signal generation unit 118 comprises a transmission signal generator 184, optical modulator 130 and encoder 132. Transmission electrical pulse signals for the first channel are generated by the transmission signal generator 184 and are supplied to the optical modulator 130. The structure of the encoded optical pulse signal generation units for the second through fourth channels are similar to that of the first channel encoded optical pulse signal generation unit 118, and so explanations are omitted.

The optical pulse train generation unit 102 comprises a multi-wavelength continuous-wave light source 134, electrical clock signal generator 136, and optical pulse train generator 114. The multi-wavelength continuous-wave light source 134 comprises CW light sources 104, 106, 108 and 110 at wavelengths $\lambda_1$, $\lambda_2$, $\lambda_3$ and $\lambda_4$ respectively, and an optical coupler 112. In the following explanation it is assumed that the order of the wavelengths is $\lambda_1$, $\lambda_2$, $\lambda_3$ and $\lambda_4$, that is, that either $\lambda_1 > \lambda_2 > \lambda_3 > \lambda_4$, or that $\lambda_1 < \lambda_2 < \lambda_3 < \lambda_4$.

CW light output from the CW light sources 104, 106, 108, 110 is combined by the optical coupler 112 to generate multi-wavelength CW light 113, which is input to the optical pulse train generator 114. An electrical clock signal from the electrical clock signal generator 136 is supplied to the optical pulse train generator 114, and in the optical pulse train generator 114 the multi-wavelength CW light 113 is converted into a multi-wavelength optical pulse train 115 synchronized with the electrical clock signal. That is, a multi-wavelength optical pulse train 115 is generated and output by the optical pulse train generation unit 102.

The multi-wavelength optical pulse train 115 is input to the optical splitter 116 and divided into a first optical pulse train 117-1, a second optical pulse train 117-2, a third optical pulse train 117-3, and a fourth optical pulse train 117-4; these are supplied to the first channel encoded optical pulse signal generation unit 118, second channel encoded optical pulse signal generation unit 120, third channel encoded optical pulse signal generation unit 124, and fourth channel encoded optical pulse signal generation unit 126, respectively.

The first optical pulse train 117-1 is input to the optical modulator 130, converted into optical pulse signals 131 and output, for input to the encoder 132. The optical pulse signals 131 input to the encoder 132 are converted into encoded optical pulse signals 133 by the encoder 132, and are input to the multiplexer 140. The optical modulator 130 is supplied by the transmission signal generator 184 with binary digital electrical signals which are the first channel transmission signals; these first channel transmission signals are reflected in the optical pulse signals 131.

On the other hand, the second optical pulse train 117-2 is input to the second channel encoded optical pulse signal generation unit 120, and first encoded optical pulse signals 121, reflecting binary digital electrical signals which are the second channel transmission signals, are generated and output. The second channel further comprises a polarization controller 122, and a polarization control step is executed to control the planes of polarization of the first encoded optical pulse signals 121 such that the planes of polarization of the encoded optical pulse signals 133 and 125 of the first and third channels, which are adjacent channels, are orthogonal.

As the polarization controller 122, for example, a half-wave retardation plate can be used. By placing a half-wave retardation plate with the optical axis inclined 45° with respect to the direction of the plane of polarization of the first encoded optical pulse signals 121, the plane of polarization of the first encoded optical pulse signals 121 is rotated 90° and the signals are output from the half-wave retardation plate as second encoded optical pulse signals 123. Hence the plane of polarization of the second encoded optical pulse signals 123 output from the polarization controller 122 is orthogonal to the planes of polarization of the encoded optical pulse signals 133 and 125.

A half-wave retardation plate is an optical component with a simple configuration, having a function of rotating the plane of polarization of linearly polarized light. Hence if the polarization controller, or the first polarization controller and second polarization controller, are configured comprising half-wave retardation plates, the polarization controller or the first polarization controller and second polarization controller can easily be configured.

For convenience of explanation, the encoded optical pulse signals output from the second channel encoded optical pulse signal generation unit 120 are taken to be the first encoded optical pulse signals 121, and the encoded optical pulse signals output from the polarization controller 122 are distinguished from the second encoded optical pulse signals 123; but only the planes of polarization of these signals are different. Hence except when there is a need for differentiation, for convenience of explanation both are referred to as encoded optical pulse signals.

The third optical pulse train 117-3 is input to the third channel encoded optical pulse signal generation unit 124 and converted into encoded optical pulse signals 125, which are output. The third channel transmission signals are reflected in the encoded optical pulse signals 125; in the third channel, the same processing as the above-described processing for the first channel is performed.

On the other hand, the fourth optical pulse train 117-4 is input to the fourth channel encoded optical pulse signal generation unit 126, and first encoded optical pulse signals 127, reflecting binary digital electrical signals which are the fourth channel transmission signals, are generated and output.

The fourth channel comprises a polarization controller 128. By means of this polarization controller 128, a polarization control step is executed, in which the planes of polarization of the first encoded optical pulse signals 127 are controlled so as to be orthogonal to the planes of polarization of the encoded optical pulse signals 125 in the third channel, which is an adjacent channel. This polarization control step is similar to the step for the second channel. The planes of polarization of the second encoded optical pulse signals 129 output from the polarization controller 128 are orthogonal to the planes of polarization of the encoded optical pulse signals 125. In the fourth channel also, similarly to the second channel, except in cases where there is a need to make a distinction, for convenience of explanation the first encoded optical pulse signals 127 and second encoded optical pulse signals 129 will both be referred to as encoded optical pulse signals.

The respective encoded optical pulse signals of the first channel through the fourth channel are input to the multiplexer 140 and combined to generate optical code division multiplexed signals 141, which are transmitted to the reception unit 300.

The structure and functions of the reception unit 300 of an OCDM transmission/reception device to implement the first invention are explained, referring to FIG. 9. FIG. 9 is a summary block diagram of the reception unit 300. The reception unit 300 comprises a demultiplexer 302, reception unit first channel 310, reception unit second channel 320, reception unit third channel 322, and reception unit fourth channel 324. The reception unit second channel 320, reception unit third channel 322, and reception unit fourth channel 324 have the same structure as the reception unit first channel 310, and so in the following the reception unit first channel 310 is explained, and explanations of the structures of the other channels are omitted.

The reception unit first channel 310 comprises a decoder 312, clock signal extractor 314, time gate unit 316, and photoelectric converter 318.

Optical code division multiplexed signals 141 transmitted to the reception unit 300 are input to the demultiplexer 302 and divided into first optical code division multiplexed signals 303-1, second optical code division multiplexed signals 303-2, third optical code division multiplexed signals 303-3, and fourth optical code division multiplexed signals 303-4, and these are respectively supplied to the reception unit first channel 310, reception unit second channel 320, reception unit third channel 322, and reception unit fourth channel 324.

The first optical code division multiplexed signals 303-1 which are intensity-divided and supplied to the reception unit first channel 310 are input to the decoder 312 and decoded, to generate first decoded optical pulse signals 313b, which are output. In addition, clock signal extraction signals 313a, intensity-divided and generated from the first optical code division multiplexed signals 303-1, are output from the decoder 312.

The clock signal extraction signals 313a are input to the clock signal extractor 314 to generate and output electrical clock signals 315, which are supplied to the time gate unit 316. This step is the clock signal extraction step, and is executed similarly as step B1 in the optical code division multiplexing transmission/reception method of the second invention, described below. On the other hand, the first decoded optical pulse signals 313b are input to the time gate unit 316 and subjected to time gate processing to generate second decoded optical pulse signals 317, which are output. This step is the time gate processing step, and is executed similarly as step B2 in the optical code division multiplexing transmission/reception method of the second invention, described below. The second decoded optical pulse signals 317 are converted into received signals of the first channel by the photoelectric converter 318.

The first decoded optical pulse signals 313b comprise superpositioned signal components and noise components of the first channel optical pulse signals 131. Hence in order to reduce communication errors and similar and improve reception quality, the noise components must be eliminated. The time gate processing executed in the time gate unit 316 is the means to eliminate noise components. Time gate processing is processing to adjust the reception timing for each channel, such that noise components and signal components are not superposed on the time axis after decoding. Specifically, during time zones in which signal components pass through the time gate unit 316, the time gate is in the on state, and during time zones in which the noise components pass through the time gate unit 316, the time gate is in the off state, so that only signal components can pass through the time gate unit 316. After this processing, the signals output from the time gate unit 316 are the second decoded optical pulse signals 317.

The second optical code division multiplexed signals 303-2, third optical code division multiplexed signals 303-3, and fourth optical code division multiplexed signals 303-4, supplied to the reception unit second channel 320, reception unit third channel 322, and reception unit fourth channel 324 respectively, are processed similarly, and second decoded optical pulse signals are generated in the respective channels. The second decoded optical pulse signals in the respective channels are converted into the received signals for the respective channels by photoelectric converters for the respective channels.

That is, in the reception step realized in the reception unit first channel 310, the following processing is performed in order. First, optical code division multiplexed signals 141 are intensity-divided by channel. The divided optical code division multiplexed signals (here, the first optical code division multiplexed signals 303-1) are decoded, by channel, using the same time-spreading wavelength-hopping code used at the time of encoding. Through this decoding, decoded optical pulse signals (here, first decoded optical pulse signals 313b), comprising the auto-correlated wavelength components and cross-correlated wavelength components of the transmission optical pulse signals, are generated. From the decoded optical pulse signals, only the auto-correlated waveform components are extracted, and the received signals are obtained.

Further, in the clock signal extractor 314, the clock signal extraction step of extracting clock signals from divided encoded optical pulse signals is executed, and in the time gate unit 316, the time gate processing step is executed to retrieve decoded optical pulse signals (here, the second decoded optical pulse signals 317), comprising only auto-correlated waveform components, from the decoded optical pulse signals (here, the first decoded optical pulse signals 313b) using the clock signals.

A reception step similar to that described above is realized in the reception unit second channel 320, reception unit third channel 322, and reception unit fourth channel 324 as well.

In the above explanation, in the reception step of extracting only the auto-correlated waveform components of the decoded optical pulse signals (equivalent to the decoded optical pulse signals 313b in the first aspect) to obtain the received signals, a clock signal extraction step and a time gate processing step were used; but these steps are not necessary. By subjecting the decoded optical pulse signals to threshold value processing, the cross-correlated waveform components (that is, noise components) can be eliminated.

Specifically, by passing the decoded optical pulse signals through a saturable absorption medium, threshold value processing of the decoded optical pulse signals can be performed. A saturable absorption medium has the property of transmitting light of intensity equal to or greater than a constant value, and of blocking light at intensities below this value. Hence because the intensity of auto-correlated waveform components is generally greater than the intensity of noise components, only the auto-correlated waveform components can be selectively passed through the saturable absorption medium.

Further, threshold value processing can also be performed by performing electrical filter processing after converting the decoded optical pulse signals into electrical decoded pulse signals in the photoelectric converter 318. Any of these threshold value processing methods can be executed using current optical technology and electronics technology.

However, when the number of channels to be multiplexed is large, or when the code period is set to be short, there are cases in which a sufficiently large difference in the intensities of cross-correlated waveform components and auto-correlated waveform components cannot be secured. In such cases, it may not be possible to obtain adequate communication quality using only the above-described threshold value processing, that is, reception errors may occur. In such cases, inclusion of a clock signal extraction step and time gate processing step is effective.

FIG. 10A through FIG. 10D shows the time waveforms, within the range of a data period Tb, of first decoded optical pulse signals, which in the optical code division multiplexed transmission/reception method of the first invention are obtained by receiving and decoding such that auto-correlated waveforms and noise components are not superposed at the same times. In FIG. 10A to FIG. 10D, the horizontal axis is the time axis, showing the range of a data period Tb. The vertical axis indicates the optical intensity, on an arbitrary scale. FIG. 10A through FIG. 10D are similar to the above FIG. 7A through FIG. 7D, with the difference that the vertical axis also shows the direction of the plane of polarization.

As explained above, the direction of the plane of polarization of first decoded optical pulse signals of the first and third channels, and the direction of the plane of polarization of first decoded optical pulse signals of the second and fourth channels, are orthogonal, and so in the following explanation it is assumed that the direction of the plane of polarization of the former is the x direction, and that the direction of the plane of polarization of the latter is the y direction. In order to represent the fact that the plane of polarization of first decoded optical pulse signals of the second and fourth channels is orthogonal to that of the first and third channels, the vertical axes in FIG. 10A through FIG. 10D are drawn with the time waveforms on the upper side of the time axis when the plane of polarization is the x direction, and when the plane of polarization is the y direction, the time waveforms are drawn below the time axis.

The time waveforms of decoded optical pulse signals shown in FIG. 10A through FIG. 10D, similarly to the cases of FIG. 7A through FIG. 7D, are for four multiplexed channels (M=4), with the code period Tc equal to four times the data period Tb (G=4), and assuming that the codes allocated to each of the first through fourth channels are given by the above-described code 1 through code 4. Placement on the time axis of the respective chip pulse trains, comprising 16 chip pules obtained by encoding the respective adjacent optical pulses, is similar to the cases of FIG. 7A through FIG. 7D, and so a redundant explanation is omitted.

FIG. 10A, FIG. 10B, FIG. 10C and FIG. 10D show time waveforms of first decoded optical pulse signals for the respective first, second, third and fourth channels. In FIG. 10A, FIG. 10B, FIG. 10C and FIG. 10D, the symbols I, II, III and IV are auto-correlated waveform components and cross-correlated waveform components comprising chip pulses from respectively the first, second, third and fourth channels. Unshaded chip pulses are chip pulses comprising auto-correlated waveform components; shaded chip pulses are chip pulses comprising cross-correlated waveform components.

In the time waveform of first decoded optical signals of the first channel shown in FIG. 10A, chip pulses from the first channel (shown as unshaded rectangles) are superposed in the leading time slot in the data period, to reproduce a single optical pulse. Similarly in the time waveforms of decoded optical pulses of the second, third and fourth channels shown in FIG. 10B, FIG. 10C and FIG. 10D respectively, chip pulses from the second, third and fourth channels (shown as unshaded rectangles) are superposed in the leading time slot position in the data period (the same time slot position in the same data period), reproducing a single optical pulse.

In FIG. 10A, FIG. 10B, FIG. 10C and FIG. 10D, shaded rectangles are chip pulses from channels other than the channel in question, that is, are noise components. In the time waveform of the first decoded optical pulse signal of the first channel shown in FIG. 10A, chip pulses from channels other than the first channel, indicated by II, III and IV, are shown as shaded rectangles. Similarly in the time waveform of the first decoded optical pulse signal of the second channel shown in FIG. 10B, chip pulses from channels other than the second channel, indicated by I, III and IV, are shown as shaded rectangles. The time waveforms of the first decoded optical pulse signal of the third and fourth channels, shown in FIG. 10C and FIG. 10D, are similarly represented.

As the density of optical pulses comprised by an optical pulse signal rises, it becomes more difficult to distinguish between optical pulses forming auto-correlated waveforms and optical pulses forming cross-correlated waveforms; hence in order to address such situations in the optical code division multiplexing transmission/reception method of the first invention, time gate processing in the time gate unit is performed to increase the fraction of cross-correlated waveform components which are eliminated, as a means of obtaining decoded optical pulse signals in which cross-correlated waveform components are adequately eliminated.

Further, chip pulses are not optical pulses which are entirely of a single wavelength, but have an optical spectrum of a finite width. Consequently time gate signals comprise noise components as well as auto-correlated waveform components. That is, there is overlap of the edge portions on the frequency axis of chip pulses which form cross-correlated waveforms.

However, according to the optical code division multiplexing transmission/reception method of the first invention, the directions of the planes of polarization of first decoded optical pulse signals of adjacent channels, that is, the first and second channels, the second and third channels, and the third and fourth channels, are mutually orthogonal, so that even when the edge portions on the frequency axis of chip pulses forming cross-correlated waveforms overlap, interference does not occur. Hence even when the number of channels multiplexed is large, or when the code period is set to be short, received signals with a high S/N ratio can be obtained.

Second Embodiment

Figure 11:
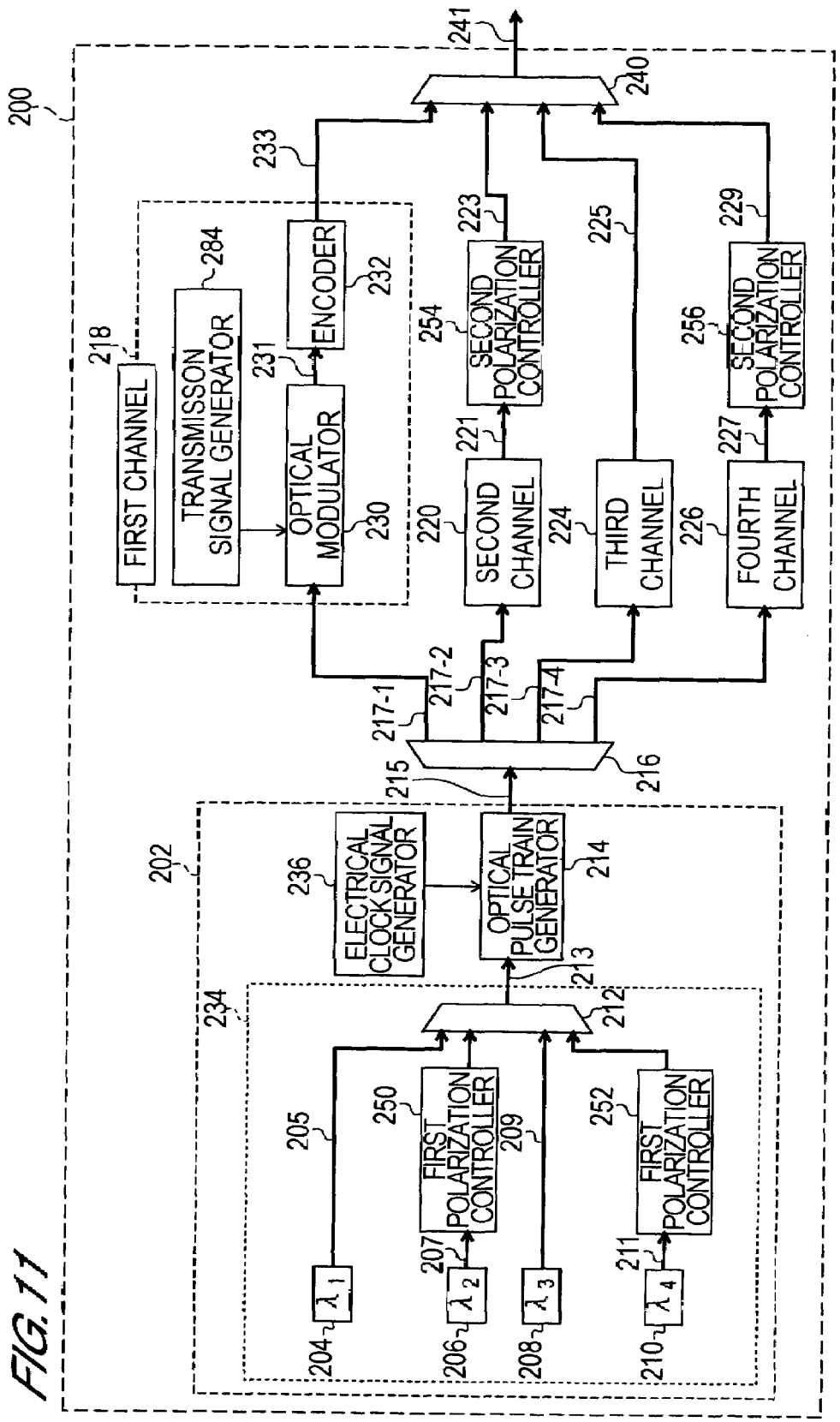
FIG. 11 is a summary block diagram of the transmission unit of an optical code division multiplexing transmission/reception device to implement the optical code division multiplexing transmission/reception method of the second invention; and, FIG. 12 shows the time waveforms of decoded optical pulse signals in the range of the time zone Tb in the optical code division multiplexing transmission/reception method of the second invention.

The optical code division multiplexing transmission/reception method of a second invention, and the structure and operation of a device to implement this method, are explained referring to FIG. 11 and FIG. 9. FIG. 11 is a summary block diagram of the transmission unit of a device to implement the optical code division multiplexing transmission/reception method of the second invention; FIG. 9 is a summary block diagram of the reception unit. In FIG. 11 and FIG. 9, a case is shown in which the number of channels multiplexed is four; but the following explanation is clearly not limited to a case of four channels, but applies to other cases as well.

As shown in FIG. 11, the transmission unit 200 comprises an optical pulse train generation unit 202, optical splitter 216, first channel encoded optical pulse signal generation unit 218, second channel encoded optical pulse signal generation unit 220, third channel encoded optical pulse signal generation unit 224, fourth channel encoded optical pulse signal generation unit 226, and multiplexer 240. In addition to these components, a characteristic is the provision of first polarization controllers 250 and 252 and second polarization controllers 254 and 256.

The optical pulse train generation unit 202 comprises a multi-wavelength continuous-wave light source 234, electrical clock signal generator 236, and optical pulse train generator 214. The multi-wavelength continuous-wave light source 234 comprises CW light sources 204, 206, 208 and 210, the wavelengths of which are $\lambda_1, \lambda_2, \lambda_3$ and $\lambda_4$ respectively, a first polarization controller 250, a first polarization controller 252, and an optical coupler 212. In the following explanation it is assumed that the order of the wavelengths is $\lambda_1, \lambda_2, \lambda_3$ and $\lambda_4$, that is, that either $\lambda_1 > \lambda_2 > \lambda_3 > \lambda_4$, or that $\lambda_1 < \lambda_2 < \lambda_3 < \lambda_4$.

The first polarization controller 250 is placed between the CW light source 206 and the optical coupler 212, and the first polarization controller 252 is placed between the CW light source 210 and the optical coupler 212.

The light 205 output from the CW light source 204 and the light 209 output from the CW light source 208 are input to the optical coupler 212. On the other hand, the light 207 output from the CW light source 206 and the light 211 output from the CW light source 210 are input via the first polarization controllers 250 and 252 to the optical coupler 212. The planes of polarization of the light 207 output from the CW light source 206 and the light 211 output from the CW light source 210 are rotated by 90° by the first polarization controllers 250 and 252, respectively.

As the first polarization controllers 250 and 252, for example, half-wave retardation plates can be used. By placing a half-wave retardation plate with the optical axis inclined 45° with respect to the direction of the plane of polarization of the light 207 output from the CW light source 206 and the light 211 output from the CW light source 210, the plane of polarization of the light 207 output from the CW light source 206 and of the light 211 output from the CW light source 210 is rotated 90° and the light is output from the half-wave retardation plates (step A2). Hence the planes of polarization of the CW light output from the first polarization controllers 250 and 252 are orthogonal to the planes of polarization of the light 205 output from the CW light source 204 and the light 209 output from the CW light source 208.

CW light output from the CW light sources 204, 206, 208 and 210 is combined by the optical coupler 212, either directly or via a first polarization controller as described above, to generate multi-wavelength CW light 213 which is input to the optical pulse train generator 214 (steps A1 and A3). Electrical clock signals are supplied to the optical pulse train generator 214 from the electrical clock signal generator 236, and in the optical pulse train generator 214 the multi-wavelength CW light 213 is converted into a multi-wavelength optical pulse train 215 synchronized with the electrical clock signals. That is, a multi-wavelength optical pulse train 215 is generated and output by the optical pulse train generation unit 202 (step A4).

The multi-wavelength optical pulse train 215 is input to the optical splitter 216 and divided into a first optical pulse train 217-1, second optical pulse train 217-2, third optical pulse train 217-3, and fourth optical pulse train 217-4, which are respectively supplied to the first channel encoded optical pulse signal generation unit 218, second channel encoded optical pulse signal generation unit 220, third channel encoded optical pulse signal generation unit 224, and fourth channel encoded optical pulse signal generation unit 226.

The first channel encoded optical pulse signal generation unit 218 comprises a transmission signal generator 284, optical modulator 230, and encoder 232. Transmission electrical pulse signals for the first channel are generated by the transmission signal generator 284 and are supplied to the optical modulator 230. The first optical pulse train 217-1 is input to the optical modulator 230 and converted into optical pulse signals 231 which are output, for input to the encoder 232 (step A5). The structure of the encoded optical pulse signal generation units for the second through fourth channels are similar to the encoded optical pulse signal generation unit 218 of the first channel, and so explanations are omitted.

The first optical pulse train 217-1 is input to the first channel encoded optical pulse signal generation unit 218 and converted into encoded optical pulse signals 233 (step A6), which are input to the multiplexer 240. The step in which the first optical pulse train 217-1 is converted into encoded optical pulse signals 233 is similar to the case of the above-described optical code division multiplexed transmission/reception method of the first invention.

On the other hand, the second optical pulse train 217-2 is input to the second channel encoded optical pulse signal generation unit 220, to generate and output first encoded optical pulse signals 221 reflecting binary digital electrical signals which are the transmission signals for the second channel. The second channel further comprises a second polarization controller 254, and a polarization control step is executed in which the plane of polarization of the first encoded optical pulse signals 221 is controlled such that the planes of polarization of the encoded optical pulse signals 233 and 225 of the first and third channels, which are adjacent channels, are orthogonal (step A7).

Similarly to the above-described case of the first invention, a half-wave retardation plate can for example be used as the second polarization controller 254. By placing a half-wave retardation plate with the optical axis inclined 45° with respect to the direction of the plane of polarization of the first encoded optical pulse signals 221, the plane of polarization of the first encoded optical pulse signals 221 is rotated 90° and the signals are output from the half-wave retardation plate as second encoded optical pulse signals 223. Hence the plane of polarization of the second encoded optical pulse signals 223 output from the second polarization controller 254 is orthogonal to the planes of polarization of the encoded optical pulse signals 233 and 225.

For convenience of explanation, encoded optical pulse signals output from the second channel encoded optical pulse signal generation unit 220 are taken to be first encoded optical pulse signals 221, and are distinguished from second encoded optical pulse signals 223 which are encoded optical pulse signals output from the second polarization controller 254; here too, however, similarly to the above-described first invention, there is only a difference in the plane of polarization of the signals. Hence for convenience of explanation, unless there is a need for discrimination, both shall be described as encoded optical pulse signals.

The third optical pulse train 217-3 is input to the third channel encoded optical pulse signal generation unit 224 and converted into encoded optical pulse signals 225, which are output. The transmission signals of the third channel are reflected in the encoded optical pulse signals 225. In the third channel, the same processing as for the first channel, described above, is performed.

On the other hand, the fourth optical pulse train 217-4 is input to the fourth channel encoded optical pulse signal generation unit 226, and first encoded optical pulse signals 227 reflecting binary digital electrical signals which are the transmission signals of the fourth channel are generated and output.

The fourth channel comprises a second polarization controller 256, and a polarization control step is executed in which the plane of polarization of the first encoded optical pulse signals 227 is controlled so as to be orthogonal to the plane of polarization of encoded optical pulse signals 225 of the third channel, which is an adjacent channel. This polarization control step is similar to the step for the second channel. The plane of polarization of second encoded optical pulse signals 229 output from the second polarization controller 256 is orthogonal to the plane of polarization of encoded optical pulse signals 225. In the fourth channel also, similarly to the second channel, except when there is a need to distinguish between them, first encoded optical pulse signals 227 and second encoded optical pulse signals 229 will both be referred to as encoded optical pulse signals.

The respective encoded optical pulse signals of the first channel through the fourth channel are input to the multiplexer 240 and combined, to generate optical code division multiplexed signals 241, which are transmitted to the reception unit 300.

In an OCDM transmission/reception device to implement the second invention, the same reception unit as the reception unit 300 of an OCDM transmission/reception device to implement the first invention can be used. That is, similarly to the reception unit 300 to implement the first invention, step B1, which is a clock signal extraction step, is executed, in which signals for clock signal extraction 313a are obtained by partial intensity division from first optical code division multiplexed signals 303-1, and these signals are input to a clock signal extractor 314 to generate and output electrical clock signals 315. On the other hand, step B2, which is a time gate processing step, is similarly executed, in which the first decoded optical pulse signals 313b are input to a time gate unit 316, and time gate processing is performed to generate and output second decoded optical pulse signals 317.

The structure and functions of the reception unit 300 of the OCDM transmission/reception device to implement the second invention are the same as in the first invention described above, and so an explanation is omitted. In FIG. 9, which is a summary block diagram of the OCDM transmission/reception device, a case is assumed of use as an OCDM transmission/reception device to implement the second invention, and an optical fiber transmission path, joined to the input end of the demultiplexer 302, is shown as (241) to represent the optical code division multiplexed signals 241 transmitted from a transmission unit 200.

FIG. 12A through FIG. 12D show, within the range of a data period Tb, the time waveforms of first decoded optical pulse signals obtained in the optical code division multiplexing transmission/reception method of the second invention by receiving and decoding signals such that auto-correlated waveforms and noise components are not superposed at the same time position. In FIG. 12A through FIG. 12D, the horizontal axis is the time axis, and the range of a data period Tb is shown. The vertical axis indicates optical intensity on an arbitrary scale. FIG. 12A through FIG. 12D are similar to the above-described FIG. 10A through FIG. 10D, and the vertical axis also indicates the direction of the plane of polarization.

By introducing the first polarization controllers, the plane of polarization of light of wavelength $\lambda_1$ and wavelength $\lambda_3$, and the plane of polarization of light of wavelength $\lambda_2$ and wavelength $\lambda_4$, are orthogonal; in the following explanation, the direction of the plane of polarization of the former is taken to be the x direction, and the direction of the plane of polarization of the latter is taken to be the y direction.

Further, by introducing the second polarization controllers, as explained below, the direction of the plane of polarization of first decoded optical pulse signals of the first and third channels, and the direction of the plane of polarization of first decoded optical pulse signals of the second and fourth channels, are orthogonal. Here, for convenience of explanation the directions of the plane of polarization of light output from the CW light source, output from the CW light sources 204, 206, 208 and 210, are all assumed to be the x direction.

In order to represent the fact that the direction of the plane of polarization of light at wavelengths $\lambda_1$ and $\lambda_3$ is orthogonal to the direction of the plane of polarization of light at wavelengths $\lambda_2$ and $\lambda_4$, the vertical axes in FIG. 12A through FIG. 12D are drawn with the time waveforms on the upper side of the time axis when the plane of polarization is the x direction, and when the plane of polarization is the y direction, the time waveforms are drawn below the time axis.

Because the light passes through the second polarization controller without passing through the first polarization controller, the plane of polarization of light (chip pulses) at wavelengths $\lambda_2$ and $\lambda_4$ comprised by first encoded optical pulse signals of the first and third channels is in the y direction. On the other hand, because the light passes through both the first polarization controller and the second polarization controller, the plane of polarization of light (chip pulses) at wavelengths $\lambda_2$ and $\lambda_4$ comprised by the first encoded optical pulse signals of the second and fourth channels is rotated 180° (=90°+90°), and so in the end the plane of polarization is in the x direction.

Similarly, because the light passes through neither the first polarization controller nor the second polarization controller, the plane of polarization of light (chip pulses) of the components at wavelengths $\lambda_1$ and $\lambda_3$ comprised by the first encoded optical pulse signals of the first and third channels remains in the x direction. On the other hand, because the light passes through only the second polarization controller, the plane of polarization of the light (chip pulses) of wavelengths $\lambda_1$ and $\lambda_3$ comprised by the first encoded optical pulse signals of the second and fourth channels is rotated 90°, so that in the end the plane of polarization is in the y direction.

The polarization states of chip pulses comprised by each channel, explained above, are further explained referring to FIG. 12A through FIG. 12D.

The time waveforms of decoded optical pulse signals shown in FIG. 12A through FIG. 12D, similarly to the cases of FIG. 7A through FIG. 7D and FIG. 10A through FIG. 10D, are for four multiplexed channels (M=4) and a code period Tc of four times the data period Tb (G=4), and are drawn assuming a case in which the codes allocated to the first through fourth channels are given by code 1 through code 4 respectively. Placement on the time axis of chip pulse trains comprising 16 chip pulses, obtained by decoding adjacent optical pulses, is similar to the cases of FIG. 7A through FIG. 7D and FIG. 10A through FIG. 10D, and so a redundant explanation is omitted.

FIG. 12A, FIG. 12B, FIG. 12C and FIG. 12D show time waveforms of first decoded optical pulse signals for the first, second, third and fourth channels respectively. In FIG. 12A through FIG. 12D, the symbols I, II, III and IV are auto-correlated waveform components and cross-correlated waveform components comprised by chip pulses from the first, second, third, and fourth channels respectively. Chip pulses which are unshaded are chip pulses comprised by auto-correlated waveform components; shaded chip pulses are chip pulses comprised by cross-correlated waveform components.

Figure 12A:
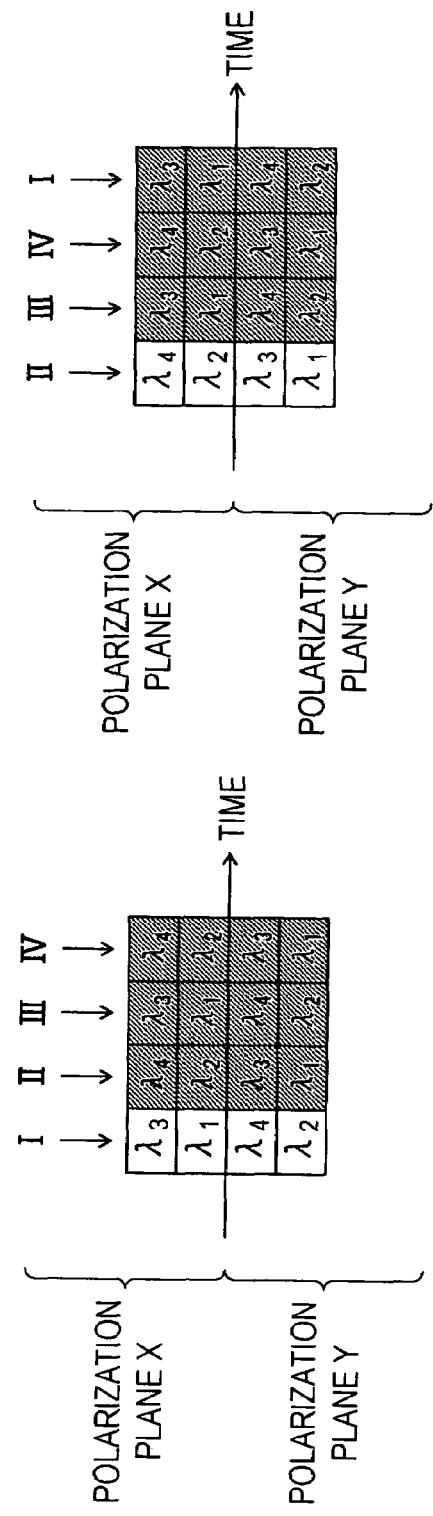
Figure 12B:
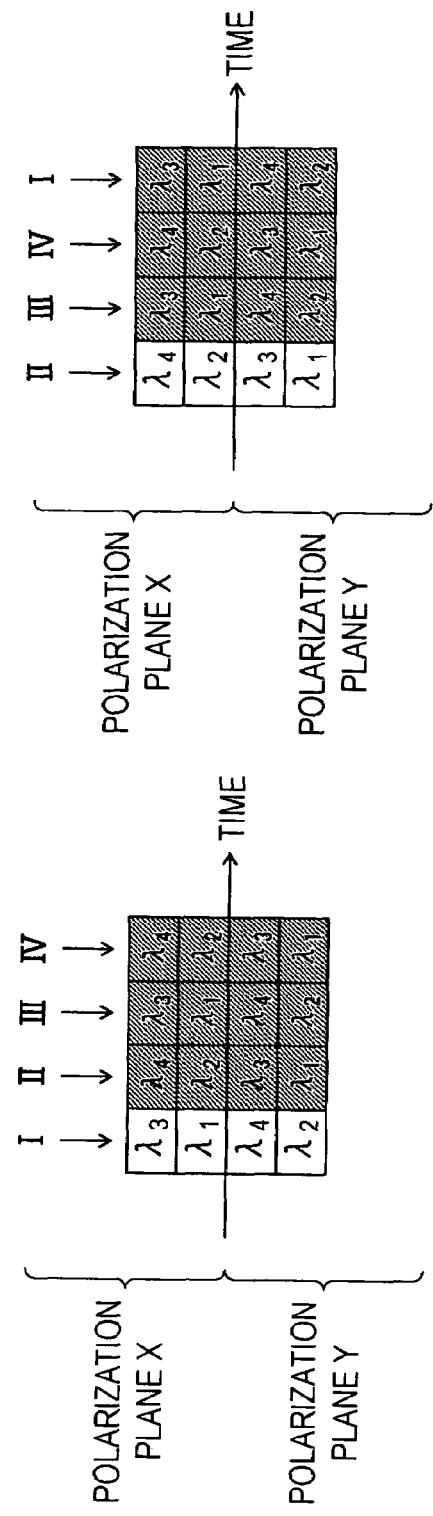
Figure 12C:
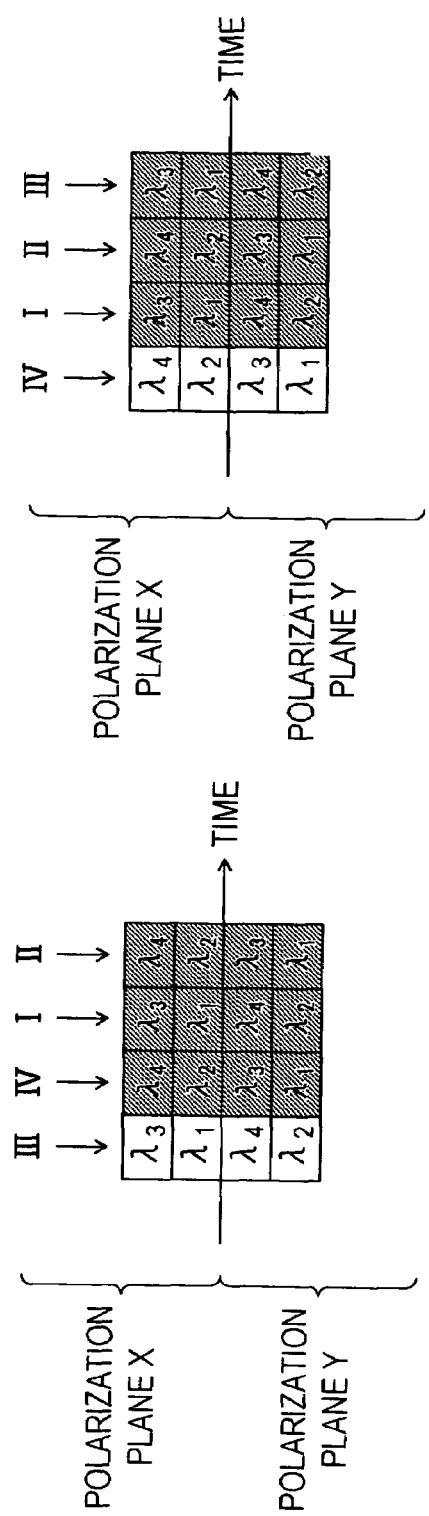
Figure 12D:
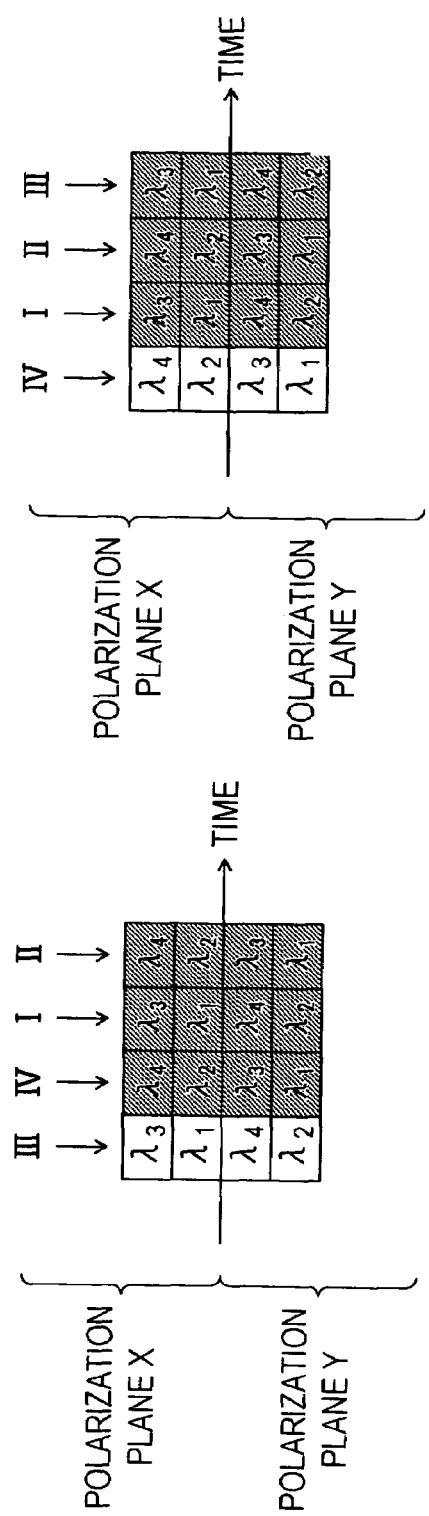

In the time waveform of a first decoded optical pulse signal for the first channel shown in FIG. 12A, chip pulses from the first channel (represented by unshaded rectangles) are superposed in the leading time slot position in the data period, reproducing a single optical pulse. Similarly in the time waveforms of decoded optical pulse signals for the second, third and fourth channels, shown in FIG. 12B, FIG. 12C and FIG. 12D, chip pulses from the second, third and fourth channels (represented by unshaded rectangles) are superposed in the leading time slot position in the data period (the same time slot position in the same data period), reproducing a single optical pulse.

In FIG. 12A, FIG. 12B, FIG. 12C and FIG. 12D, shaded rectangles represent chip pulses from channels other than the respective channels in question, that is, noise components. In the time waveform for the first decoded optical pulse signal of the first channel shown in FIG. 12A, chip pulses from channels other than the first channel, indicated by II, III and IV, are shown as shaded rectangles. Similarly in the time waveform for the first decoded optical pulse signal of the second channel in FIG. 12B, chip pulses from channels other than the second channel, indicated by I, III and IV, are shown as shaded rectangles; similarly for the time waveforms of first decoded optical pulse signals of the third and fourth channels, shown in FIG. 12C and FIG. 12D respectively.

As the density of optical pulses comprised by an optical pulse signal rises, it becomes more difficult to distinguish optical pulses forming auto-correlated waveforms from optical pulses forming cross-correlated waveforms. Hence in the optical code division multiplexing transmission/reception method of the first invention, in order to address such cases, time gate processing in a time gate unit was employed to increase the fraction of cross-correlated waveform components that are eliminated, as a means of obtaining decoded optical pulse signals in which cross-correlated waveform components are adequately eliminated.

Further, chip pulses are not light pulses with have only a single wavelength, but instead have an optical spectrum of finite width. Hence noise components are comprised by time gate signals in addition to auto-correlated waveform components. That is, there is overlapping of the edge portions on the frequency axis of chip pulses which form cross-correlated waveforms.

However, according to the optical code division multiplexing transmission/reception method of the second invention, the directions of the planes of polarization of first decoded optical pulse signals of adjacent channels, that is, of the first and second channels, of the second and third channels, and of the third and fourth channels, are mutually orthogonal. This is similar to the case of the optical code division multiplexing transmission/reception method of the first invention. However, in the optical code division multiplexing transmission/reception method of the second invention, the polarization direction of chip pulses of wavelengths $\lambda_1$ and $\lambda_3$, and the polarization direction of chip pulses of wavelengths $\lambda_2$ and $\lambda_4$, are also mutually orthogonal.

In addition to the advantage, similar to the optical code division multiplexing transmission/reception method of the first invention, that there is reduced beat noise arising from overlapping on the frequency axis of edge portions of chip pulses forming auto-correlated waveforms and chip pulses forming cross-correlated waveforms, the optical code division multiplexing transmission/reception method of the second invention is also effective in reducing beat noise arising due to overlapping on the frequency axis of adjacent wavelength components of auto-correlated waveforms. Consequently even when the number of channels to be multiplexed is large, or when the code period is set to be short, received signals with a still higher S/N ratio can be obtained.

In an optical code division multiplexing transmission/reception device of this invention to realize the optical code division multiplexing transmission/reception methods of the first and second inventions, it is suitable that the encoder and decoder be configured comprising SSFBs.

The signal transmission paths of optical communication systems are generally formed using optical fibers. Hence it is desirable that components comprised by an optical code division multiplexing transmission/reception device used in optical communication systems have the characteristics of ease of connection with such signal transmission paths. SSFBGs are elements fabricated by forming diffraction gratings in optical fibers, and themselves take the form of optical fibers.

Hence SSFBGs are fundamentally easy to connect with the optical fibers used in normal signal transmission paths. Thus if the encoder and decoder of an optical code division multiplexing transmission/reception device of this invention are configured using SSFBGs, then an optical code division multiplexing transmission/reception device which is easy to use and can readily be connected to normal optical fibers can be configured.

What is claimed is:

1. An optical code division multiplexing transmission/reception method, comprising:
    (A) a transmission step of using time-spreading wavelength-hopping codes, which are different for each channel, to encode optical pulse signals comprising light of different wavelengths, allocated to different channels for transmission, to generate encoded optical pulse signals, and of multiplexing said encoded optical pulse signals to be transmitted as the optical code division multiplexed signals; and
    (B) a reception step of intensity-dividing said optical code division multiplexed signals by channel, decoding said divided optical code division multiplexed signals using the same codes as said time-spreading wavelength-hopping codes by channel, generating decoded optical pulse signals comprising auto-correlated waveform components and cross-correlated waveform components of said optical pulse signals, and extracting only auto-correlated waveform components from said decoded optical pulse signals to obtain received signals, wherein said transmission step comprises:
        (A1) a step of causing continuous-wave light of different wavelengths to be generated;
        (A2) a first polarization control step of controlling the planes of polarization such that the planes of polarization of said continuous-wave light, alternating in the order of the wavelengths of said continuous-wave light, are orthogonal;
        (A3) a step of combining said continuous-wave light with polarization planes controlled, and generating multi-wavelength continuous-wave light;
        (A4) a step of converting said multi-wavelength continuous-wave light into an optical pulse train;
        (A5) a step of converting said optical pulse train into optical pulse signals;
        (A6) a step of converting said optical pulse signals into encoded optical pulse signals; and
        (A7) a second polarization control step of controlling the planes of polarization of said encoded optical pulse signals, such that the planes of polarization of said encoded optical pulse signals in adjacent channels are mutually orthogonal.

2. The optical code division multiplexing transmission/reception method according to claim 1, wherein said reception step further comprises:
    (B1) a clock signal extraction step of extracting a clock signal from said divided optical code division multiplexed signals; and
    (B2) a time gate processing step of using said clock signal to retrieve only said auto-correlated waveform components from said decoded optical pulse signals.

3. An optical code division multiplexing transmission/reception device, comprising:
    a transmission unit, which uses an encoder set to different time-spreading wavelength-hopping codes for each channel to encode optical pulse signals comprising light at different wavelengths, allocated to different channels for transmission, to generate encoded optical pulse signals, and which multiplexes said encoded optical pulse signals to be transmitted as optical code division multiplexed signals; and
    a reception unit, which intensity-divides said optical code division multiplexed signals by channel, uses a decoder set to the same codes as said time-spreading wavelength-hopping codes by channel to decode said divided optical code division multiplexed signals, generates decoded optical pulse signals comprising auto-correlated waveform components and cross-correlated waveform components of said optical pulse signals, and extracts only auto-correlated waveform components from said decoded optical pulse signals to obtain received signals, wherein said transmission unit comprises:
a continuous-wave light source which generates continuous-wave light of different wavelengths;
a first polarization controller which controls planes of polarization such that the planes of polarization of said continuous-wave light, alternating in the order of the wavelengths of said continuous-wave light, are orthogonal;
an optical coupler which combines said continuous-wave light with polarization planes controlled, to generate multi-wavelength continuous-wave light;
an optical pulse train generator which converts said multi-wavelength continuous-wave light into an optical pulse train;
an optical modulator which converts said optical pulse train into optical pulse signals;
said encoder which converts said optical pulse signals into encoded optical pulse signals; and
a second polarization controller which controls the planes of polarization of said encoded optical pulse signals, such that the planes of polarization of said encoded optical pulse signals in adjacent channels are mutually orthogonal.

4. The optical code division multiplexing transmission/reception device according to claim 3, wherein said reception unit further comprises a clock signal extractor which extracts a clock signal from said divided optical code division multiplexed signals, and a time gate unit which retrieves the auto-correlated waveform components from said decoded optical pulse signals using said clock signal.

5. The optical code division multiplexing transmission/reception device according to claim 3, wherein said first polarization controller and said second polarization controller are half-wave retardation plates.

6. The optical code division multiplexing transmission/reception device according to claim 3, wherein said encoder and said decoder comprise Super-structure fiber Bragg grating.

* * * * *